US007643676B2

(12) United States Patent  
Malvar

(10) Patent No.: US 7,643,676 B2  
(45) Date of Patent: Jan. 5, 2010

(54) SYSTEM AND METHOD FOR ADAPTIVE INTERPOLATION OF IMAGES FROM PATTERNED SENSORS

(75) Inventor: Henrique Malvar, Sammamish, WA (US)

(73) Assignee: Microsoft Corp., Redmond, WA (US)

( * ) Notice: Subject to any disclaimer, the term of this patent is extended or adjusted under 35 U.S.C. 154(b) by 830 days.

(21) Appl. No.: 11/046,324

(22) Filed: Jan. 29, 2005

(65) Prior Publication Data

US 2005/0200733 A1 Sep. 15, 2005

Related U.S. Application Data

(63) Continuation-in-part of application No. 10/801,450, filed on Mar. 15, 2004.

(51) Int. Cl.
*G06K 9/00* (2006.01)
(52) U.S. Cl. .................. 382/162; 382/167; 382/254
(58) Field of Classification Search ............. 382/162, 382/167, 254, 299, 300; 348/246, 441; 358/525
See application file for complete search history.

(56) References Cited

U.S. PATENT DOCUMENTS

| 3,971,065 | A | | 7/1976 | Bayer |
| 4,724,395 | A | | 2/1988 | Freeman |
| 5,373,322 | A | | 12/1994 | Laroche et al. |
| 5,506,619 | A | | 4/1996 | Adams, Jr. et al. |
| 5,805,217 | A | | 9/1998 | Lu et al. |
| 5,822,465 | A | * | 10/1998 | Normile et al. ............. 382/253 |
| 6,654,492 | B1 | | 11/2003 | Sasai |
| 6,771,828 | B1 | | 8/2004 | Malvar |
| 6,781,626 | B1 | * | 8/2004 | Wang ........................ 348/273 |
| 7,236,191 | B2 | | 11/2004 | Kalevo et al. |
| 6,847,396 | B1 | | 1/2005 | Lin |
| 2002/0015447 | A1 | | 2/2002 | Zhou |
| 2002/0167602 | A1 | | 11/2002 | Nguyen |

OTHER PUBLICATIONS

H. S. Malvar, L.-W. He, and R. Cutler, "High-quality linear interpolation for demosaicing of Bayer-patterned color images", *Proc. ICASSP*, Montreal, Canada, vol. 3, pp. III-485-III-488, May 2004.
X. Wu and N. Zhang, "Primary-consistent soft-decision color demosaic for digital cameras," *Proc. ICIP*, vol. I, pp. 477-480, Sep. 2003.

(Continued)

*Primary Examiner*—Brian Q Le
(74) *Attorney, Agent, or Firm*—Lyon & Harr, LLP; Katrina A. Lyon

(57) ABSTRACT

A adaptive filter interpolation method and system for the demosaicing of color images. In general, input pixels are input in a Bayer-mosaiced pattern (only one color per pixel), and output pixels are in full RGB mode (three color values per pixel). For each pixel location, in raster scan order, the processing steps can be summarized as follows. Following a regular raster scanning order (from left to right and top to bottom), for each pixel location horizontal and vertical gradients are first computed (whose computation depends on the available color for that pixel), and from those the appropriate interpolation filters are chosen from a small set of predetermined filters. Then, the chosen filters are applied to interpolate the missing data.

19 Claims, 12 Drawing Sheets
(7 of 12 Drawing Sheet(s) Filed in Color)

OTHER PUBLICATIONS

Chang, E., S. Cheung, and D. Y. Pan, Color filter array recovery using a threshold-based variable number of gradients, Proceedings of SPIE, Sensors, Cameras, and Applications for Digital Photography, Nitin Sampat, Thomas Yeh, Editors, Mar. 1999, pp. 36-43, vol. 3650.

Gunturk, B. K., Y. Altunbasak, R. M. Mersereau, Color plane interpolation using alternating projections, IEEE Transactions on Image Processing, Sep. 2002, pp. 997-1013, vol. 11, No. 9.

Kimmel, R., Demosaicing: Image reconstruction from color CCD samples, IEEE Trans. Image Processing, Sep. 1999, pp. 1221-1228, vol. 8.

Koh, C. C., J. Mukherjee, S. K. Mitra, New efficient methods of image compression in digital cameras with color filter array, IEEE Transactions on Consumer Electronics, Nov. 2003, pp. 1448-1456, vol. 49, No. 4.

Longére, P., X. Zhang, P. B. Delahunt, D. H. Brainard, Perceptual assessment of demosaicing algorithm performance, Proceedings of the IEEE, Jan. 2002, pp. 123-132, vol. 90, No. 1.

Lux, P., A novel set of closed orthogonal functions for picture coding, Arch. Elek. Ubertragung, 1977, vol. 31, pp. 267-274.

Malvar, H., Sullivan, G., YCoCg-R: A Color Space with RGB Reversibility and Low Dynamic Range, Joint Video Team (JVT) of ISO/IEC MPEG & ITU-T VCEG (ISO/IEC JTC1/SC29/WG11 and ITU-T SG16 Q.6), JVT PExt Ad Hoc Group Meeting: Jul. 22-24, 2003, Trondheim Document: JVT-I014.

Pei, S.-C., L.-K. Tam, Effective color interpolation in CCD color filter array usingsignal correlation, Int'l Conf. on Image Processing, 2000, pp. 488-491, vol. 3.

Ramanath, R., W. E. Snyder, G. L. Bilbro, and W. A. Sander, Demosaicking methods for the Bayer color array, J. Elec. Imag., 2002, pp. 306-315, vol. 11, No. 3.

Toi, T., M. Ohita, A subband coding technique for image compression in single CCDcameras with Bayer color filter arrays, IEEE Transactions on Consumer Electronics, pp. 176-180, vol. 45, No. 1, Silicon Syst. Res. Lab., NEC Corp., Kanagawa, Feb. 1999.

Colin Larose, U.S. Appl. No. 10/801,450, Office Action, Mar. 26, 2008.

* cited by examiner

Filter coefficients for Red and Blue locations.

FIG. 6A

Filter coefficients for Green locations.

SYSTEM AND METHOD FOR ADAPTIVE INTERPOLATION OF IMAGES FROM PATTERNED SENSORS

This is a continuation-in-part of application Ser. No. 10/801,450, filed Mar. 15, 2004 now U.S. Pat. No. 7,502,505 and entitled "HIGH-QUALITY GRADIENT-CORRECTED LINEAR INTERPOLATION FOR DEMOSAICING OF COLOR IMAGES".

TECHNICAL FIELD

The present invention relates in general to processing of digital color images and more particularly to a method and system of adaptively applying filters to obtain a high-quality estimate of a missing pixel color at a pixel within the image.

BACKGROUND OF THE INVENTION

Digital cameras are steadily increasing in popularity due to their declining costs, which make them well within the reach of the average consumer. In order to keep costs low, many color digital cameras are single-sensor digital cameras in which only a single image sensor is used to capture color information for each pixel in a color image. Each image sensor in a single-sensor digital camera, which is typically a charge-coupled device (CCD) or a complementary metal oxide semiconductor (CMOS), is part of a sensor array that represent the pixels of a color image. Each image sensor can only generate information about a single color at a given pixel. A color image, however, is represented by combining three separate monochromatic images. In order to display a color image, all of the red, blue and green (RGB) color values are needed at each pixel. In an ideal (and expensive) camera system, each pixel in the sensor array would be provided with three image sensors, each one measuring a red, green or blue pixel color. In a single-sensor digital camera, however, only a single red, blue or green color value can be determined at a given pixel. In order to obtain the other two missing colors, a technique must be used to estimate or interpolate the missing colors from surrounding pixels in the image.

Estimating or interpolating missing colors as discussed above is called "demosaicing". The "demosaicing" term is derived from the fact that a color filter array (CFA) is used in front of the image sensors, with the CFA being arranged in a mosaic pattern. This mosaic pattern has only one color value for each of the pixels in the image. In order to obtain the full-color image, the mosaic pattern must be "demosaiced". Thus, demosaicing is the technique of interpolating back from the image captured with a mosaic-pattern CFA, so that a full RGB value can be associated with every pixel. More specifically, a single-sensor digital camera captures the image using an image sensor array that is preceded in the optical path by a CFA. A highly common mosaic CFA is called the Bayer mosaic pattern. The Bayer mosaic pattern (or Bayer filter) is shown in FIG. 1. For each 2×2 set of pixels, two diagonally opposed pixels have green filters, and the other two pixels have red and blue filters. Since the color green (G) carries most of the luminance information for humans, its sampling rate is twice that of the color red (R) and the color blue (B).

There are multitudes of demosaicing techniques available. One of the simplest approaches to demosaicing is bilinear interpolation. In general, bilinear interpolation uses three color planes that are independently interpolated using symmetric bilinear interpolation. This interpolation uses a pixel's nearest neighbors having the same color as the color that is being interpolated. In particular, referring again to FIG. 1, in bilinear interpolation the green value g(i,j) at a pixel position (i,j) that falls in a red or blue pixel is computed by the average of the neighboring green values in a cross pattern, as follows, $$\hat{g}(i,j) = \frac{1}{4}\sum g(i+m, j+n)(m,n) = \{(0,-1), (0,1), (-1,0), (1,0)\} \quad (1)$$

Equation (1) corresponds to estimating the green value at the pixel marked 'X' (also called the "current pixel") in FIG. 1 as the average of the observed green values marked 'o'. It should be noted that the current pixel has a red color, and therefore the green and blue color values need to be interpolated. At image boundaries, only pixels that fall within the image are included, and the scaling adjusted.

Bilinear techniques typically use a small region of support. The region of support is the size of a pixel neighborhood whose values are considered for the interpolation of any given pixel. The region of support for the bilinear interpolation techniques described below typically is a 3×3 pixel region of support. Using this small of a region of support keeps memory usage and computational complexity to a minimum.

One problem, however, with many bilinear interpolation techniques is that they generate significant artifacts in the color image. This is especially true across edges and other high-frequency content in the image, since bilinear interpolation does not consider the statistical correlation among RGB values. Thus, while bilinear interpolation techniques are fast, computationally non-intensive, and easy to implement, they are also notorious for producing low-quality images due to the significant artifacts (mainly blurriness and color fringing) that they generate.

Better, though more complex, interpolation techniques take the correlation among RGB values into account. One group of interpolation techniques consider such correlation by using improved linear filters. For example, such a technique is described in a paper by S.-C. Pei and I.-K. Tam entitled "Effective color interpolation in CCD color filter array using signal correlation," in *Proc. ICIP*, pp. 488-491, September 2000 [4]. Another group of interpolation techniques consider such correlation by using nonlinear filters. These nonlinear filters essentially adapt interpolation smoothness to a measure of image activity or edginess. For example, these nonlinear interpolation techniques are discussed in the following papers: (1) P. Longére, X. Zhang, P. B. Delahunt, and D. H. Brainard, "Perceptual assessment of demosaicing algorithm performance," *Proc. IEEE*, vol. 90, pp. 123-132, January 2002 [1]; and (2) R. Ramanath, W. E. Snyder, and G. L. Bilbro, "Demosaicking methods for Bayer color arrays," *J. Electronic Imaging*, vol. 11, pp. 306-315, July 2002 [2].

Exploiting correlation among RGB channels is the main idea behind improving demosaicing performance in nonlinear interpolation techniques. Specifically, it can be assumed that in a luminance/chrominance decomposition, the chrominance components do not vary much across pixels. In a constant-hue approach described in U.S. Pat. No. 4,724,395 to Freeman entitled, "Median filter for reconstructing missing color samples", the green channel is bilinearly interpolated and then the red and blue channels are interpolated so as to maintain a constant hue, defined as the R/G and B/G ratios. However, one problem with this technique by Freeman is that even at the expense of computing these ratios, the technique still produces visible artifacts. Moreover, using complex operations (such as division and multiplication) in the computing of interpolations greatly increases the computational complexity, processing overhead, and implementation cost.

Improved results for nonlinear interpolation techniques can be obtained by starting with bilinearly interpolated green pixels and then applying median filters to the interpolated values of the color differences R–G and B–G. Improved performance can be obtained by using gradient-based nonlinear techniques, which typically estimate edge directions and adjust the interpolation formulas so that filtering is performed preferentially along edge directions, and not across them. For example, one gradient-based nonlinear technique is described in U.S. Pat. No. 5,373,322 to C. A. Laroche and M. A. Prescott entitled "Apparatus and method for adaptively interpolating a full color image utilizing chrominance gradients". The Laroche and Prescott technique first interpolates the green channel by using both the red and blue channels to determine edge directions, which determine unequal weights to the terms in equation (1) for the green channel. The color differences R–G and B–G then are interpolated. This technique is disadvantageous in that two computational passes are required to compute the missing color data in the image. A technique described in U.S. Pat. No. 5,506,619 to J. E. Adams and J. F. Hamilton, Jr., entitled "Adaptive color plane interpolation in a single color electronic camera" improves on the Laroche and Prescott technique by considering both first and second order pixel differences (see also J. E. Adams, "Design of practical color filter array interpolation algorithms for digital cameras," Proc. SPIE, vol. 3028, pp. 117-125, February 1997) [7]. Again, Adams and Hamilton's technique, and most other non-linear interpolation methods, interpolate the green pixel values first and then use these green values to interpolate the blue and red values. This requires two passes of the image in order to interpolate all red, green and blue color values which greatly increases the time necessary to interpolate the missing colors in an image.

A technique described in a paper by E. Chang, S. Cheung, and D. Y. Pan, entitled "Color filter array recovery using a threshold-based variable number of gradients," in Proc. SPIE, vol. 3650, pp. 36-43, Jan. 1999 [8], is an improvement on the above techniques by considering a variable number of gradients. A simpler but efficient algorithm that uses soft decision rules to combine interpolation results from horizontal and vertical directions is presented in a paper by X. Wu and N. Zhang, entitled "Primary-consistent soft-decision color demosaic for digital cameras," in Proc. ICIP, vol. I, pp. 477-480, September 2003 [9].

Iterative methods can lead to further improvement by using results from blue and red interpolations to correct the green interpolation, and vice-versa. That is the basis of a technique described in a paper by R. Kimmel, "Demosaicing: image reconstruction from color CCD samples," IEEE Trans. on Image Processing, vol. 8, pp. 1221-1228, September 1999 [3]. In Kimmel's approach, the interpolation steps are based on a combination of the constant-hue and gradient-based methods. A more recent technique introduced by Lukac et. al [11] also uses correction steps. A technique based on iterative projections is presented in a paper by B. K. Gunturk, Y. Altunbasak, and R. M. Mersereau, entitled "Color plane interpolation using alternating projections", in IEEE Trans. on Image Processing, vol. 11, pp. 997-1013, September 2002 [6]. The Gunturk technique has the best performance to date on a popular set of standard test images. One problem, however with the Gunturk technique is that it has a very high complexity (as many as 480 operations per input pixel). Additionally, more than one pass across the image is required to interpolate the red, green and blue pixel values, making this technique slow and computationally inefficient.

The above-described nonlinear interpolation techniques typically use a larger region of support that is used in bilinear interpolation techniques. For example, a 5×5 pixel region of support is typical for these nonlinear techniques. A 5×5 region of support yields good correlation between RGB values and produce high-quality images. A smaller region of support greatly reduces the image quality, while larger regions of support require more memory and greatly increase computational complexity.

In a paper by H. S. Malvar, L.-W. He, and R. Cutler entitled "High-quality linear interpolation for demosaicing of Bayer-patterned color images", Proc. ICASSP, Montreal, Canada, vol. 3, pp. III-485-488, May 2004 [10] and in a co-pending patent application entitled "HIGH-QUALITY GRADIENT-CORRECTED LINEAR INTERPOLATION FOR DEMOSAICING OF COLOR IMAGES" filed on Mar. 15, 2004 and assigned Ser. No. 10/801,450, an interpolation approach was defined that linearly combines a correction term with an interpolation to obtain a high-quality estimate of a missing pixel color at a pixel within the image. This interpolation technique for demosaicing color images is simple and has a speed similar to that of bilinear interpolation, while producing the high-quality images of more complex techniques. However, the interpolated image quality sometime suffers when interpolation takes place across horizontal and vertical edges, and resulting interpolated images are still subject to artifacts at these points. The artifacts are much attenuated when compared to straight bilinear interpolation, but they can still be noticed in some cases.

Therefore, what is needed is a high-quality interpolation technique that considers correlation among RGB values to improve performance and that is computationally efficient and fast. What is also needed is an interpolation technique that utilizes a larger region of support than bilinear techniques (where the region of support is comparable to that used in nonlinear techniques) for improved quality. What is further needed is an interpolation technique that optimizes the interpolated image, regardless of any edges present in the image. Additionally, what is needed is an interpolation technique that allows for all the color data to be interpolated in one computational pass across the data thereby increasing speed and minimizing computational complexity.

SUMMARY OF THE INVENTION

The invention disclosed herein includes a high-quality adaptive filter interpolation method and system for demosaicing of digital color images. The present invention overcomes the above-mentioned deficiencies of current interpolation techniques by providing a high-quality interpolation that is computationally efficient, fast, nearly optimal in a statistical sense, and provides superior image quality. Namely, the adaptive filter interpolation method and system disclosed herein uses color information from a current pixel and surrounding gradients to determine what type of interpolation filters should be used for each pixel in an image. This adaptive filter interpolation system and method is extremely efficient in that it allows all pixel colors in an image to be interpolated in one pass.

The adaptive filter method and system can operate on color images captured by digital cameras. Prior to display, the image is demosaiced using the adaptive filter interpolation method and system. Alternatively, a captured digital color image can be stored in a computing device in a compressed mosaiced form. If an application on the computing device needs to access the image, the application typically calls an appropriate application programming interface (API) to obtain the decompressed data. Most applications expect data in the RGB format, so the demosaicing must be performed before the image data is sent to the requesting application.

This invention extends the ideas in a paper by H. S. Malvar, L.-W. He, and R. Cutler entitled "High-quality linear interpolation for demosaicing of Bayer-patterned color images", *Proc. ICASSP*, Montreal, Canada, vol. 3, pp. III-485-488, May 2004 [10] and a co-pending patent application entitled "HIGH-QUALITY GRADIENT-CORRECTED LINEAR INTERPOLATION FOR DEMOSAICING OF COLOR IMAGES" filed on Mar. 15, 2004 and assigned Ser. No. 10/801,450, that described a set of linear demosaicing filters. One main advantage of the adaptive filter interpolation system and method over the previous invention is that in this invention the set of filters has been extended to include those described in the aforementioned paper [10] and the co-pending application plus additional ones targeted at interpolation along horizontal and vertical edges. The filters selected are fast-computable close approximations to those that would be statistically optimal, considering the statistics of a representative set of color images. For each pixel to be interpolated, first directional gradients are computed, and the interpolation filters to be used depend on the relative values of such directional gradients.

The adaptive filter interpolation method and system is an efficient new method to perform high-quality demosaicing. The coefficients of the filters used approximate statistically-optimal Wiener filters, and allow fast implementations that use no multiplication operations, just additions and shifts (although multiplications can be used if the processing hardware supports fast multiplications). The interpolated images generated with the adaptive filter interpolation system and method surpass the fidelity of most algorithms currently in use. Compared to other nonlinear interpolation algorithms, this adaptive interpolation system and method has the advantage that only a single pass is made over the image; all colors are interpolated during that pass. The better performing algorithms described in the references require two passes, one to interpolate green values, and another to interpolate red and blue values. A second pass is needed because the filters for red and blue interpolation use the interpolated green values. Plus, more passes may be needed to achieve a desirable quality level.

Additionally, the adaptive filter interpolation system and method essentially removes artifacts such as zipper effects by choosing the interpolation filters so that they are aligned with edges in the image. For example, in a region near a horizontal edge (a large gradient in the pixel values in the vertical direction), interpolation filters with coefficients mostly in a horizontal pattern are chosen. That way one avoids interpolating across an edge. Analogously, in a region near a vertical edge one interpolates in the vertical direction. The adaptive filter interpolation method above requires that the magnitude of the gradient delta $G_d$ (the difference between the pixel-value gradients in the horizontal and vertical directions) reaches a threshold T for directional filtering to take place. That has a significant impact on improving mean square error (MSE), and reduces the generation of artifacts in some textured areas and diagonal edges. Furthermore, the adaptive filter interpolation system uses near-optimal linear filters that are not directionally oriented for pixels in which $|G_d|$ is below the threshold T.

The operation of the adaptive filter interpolation system and method can be described as follows. In general, input pixels are input in a Bayer-mosaiced pattern (only one color per pixel), and output pixels are in full RGB mode (three color values per pixel). For each pixel location, in raster scan order, the processing steps can be summarized as follows. For each pixel location horizontal and vertical gradients are first computed (whose computation depends on the available color for that pixel and the location of that pixel in the mosaic pattern), and these gradients are used to select the appropriate interpolation filters from a small set of predetermined filters. Then, the chosen filters are applied to interpolate the missing data. The gradient computations, filter selection and color interpolation are performed for each pixel before computing the same for the next pixel (that is, in one pass).

More specifically, an image in Bayer format is input. A pixel location is selected based on raster scan order and its pixel color is extracted. Next, for the given pixel location, the horizontal and vertical gradients are computed by employing a region of support around the given current pixel location in the color image. The region of support is defined as a size of a pixel neighborhood whose color values are considered for computations associated with any given pixel, such as the current pixel. A gradient differential, $G_d$, based on the relative values of horizontal and vertical gradients and dependent on the pixel location is then computed. This gradient differential is computed using the current pixel and pixels within the region of support. For each pixel, the system decides on which filter to use based on the relative values of the horizontal and vertical gradients. To this end, the gradient-differential is compared to a threshold T and the interpolation filters are selected based on how the gradient differential compares to threshold T.

If $G_d < -T$, filters are used that perform interpolation across the horizontal direction.

If $G_d > +T$, filters are used that perform interpolation across the vertical direction.

If $|G_d| < T$, linear filters described in [10] and the aforementioned co-pending patent application are used, i.e. the same filters as in [10].

The other two colors in a given pixel location are then interpolated based on the chosen filters and the pixel colors for that location are output. This process is then repeated for each pixel location in the input image.

Bayer patterns such as that in FIG. 1 are not unique, and can vary from one camera model to another. For example, in each 2×2 group of pixels the green filters could be located at the top left and bottom right positions (instead of the top right and bottom left positions shown in FIG. 1). The adaptive filter interpolation method and system can be easily applied to any such rearrangement of the Bayer pattern; at each pixel whose two missing color values are to be interpolated, one just needs to consider the pattern of neighboring pixels (e.g. for a green pixel, determine if the immediate horizontal neighbors are red or blue) and then choose the appropriate interpolation steps according to the detailed description below.

It is noted that in this section and the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

The file of this patent or application contains at least one drawing executed in color. Copies of this patent or patent application publication with color drawing(s) will be provided by the U.S. Patent and Trademark Office upon request and payment of the necessary fee.

Referring now to the drawings in which like reference numbers represent corresponding parts throughout:

FIG. 1 illustrates a Bayer mosaic pattern for color image capture in single image sensor digital camera systems. This is a typical Bayer mosaic for color image capture in single-CCD digital cameras; the G sub-image has twice as many pixels as the R and B sub-images.

FIG. 2A is a block diagram illustrating a first exemplary implementation of the adaptive filter interpolation system and method disclosed herein.

FIG. 2B is a block diagram illustrating a second exemplary implementation of the adaptive filter interpolation system and method disclosed herein.

FIG. 3 is a general flow diagram illustrating the general operation of the adaptive filter interpolation system shown in FIG. 2.

FIG. 4 is a flow diagram illustrating the more detailed operation of the adaptive filter interpolation system shown in FIG. 3.

FIG. 5 is a general flow diagram illustrating the filter selection process employed by the adaptive filter interpolation system and method.

Figure 6A:
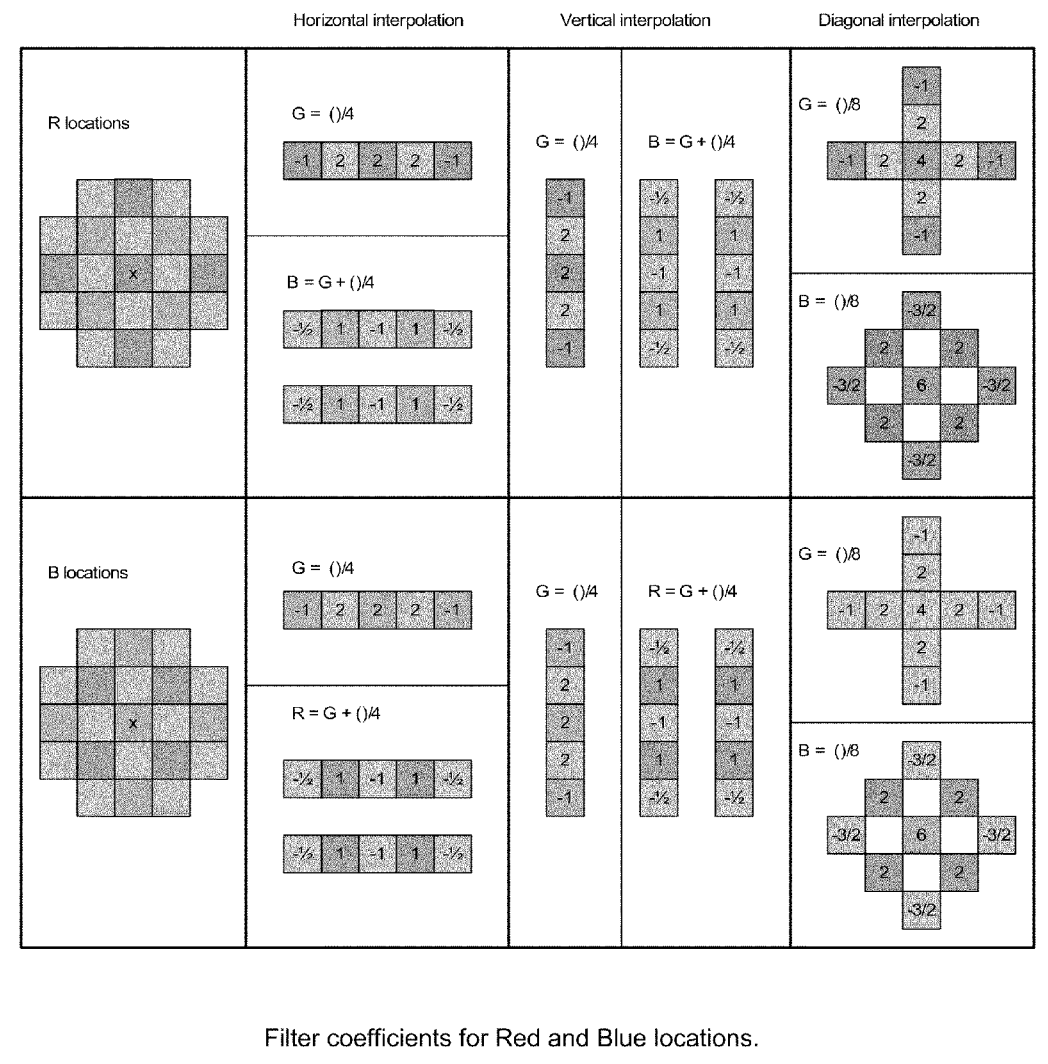

FIG. 6A depicts filter coefficients for the adaptive demosaicing method of the invention, for Red and Blue locations. The notation B=( )/4, for example, means that the final Blue value is obtained by adding the pixel values multiplied by the indicated coefficients, and then dividing the result by 4. Note that divisions by 4 and 8 can be efficiently implemented via shifts.

Figure 6B:
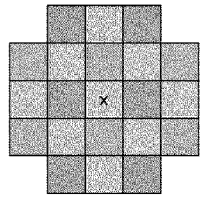

FIG. 6B depicts filter coefficients for the adaptive demosaicing method of the adaptive filter interpolation method of the invention, for Green locations.

Figures 7, 8, 9:
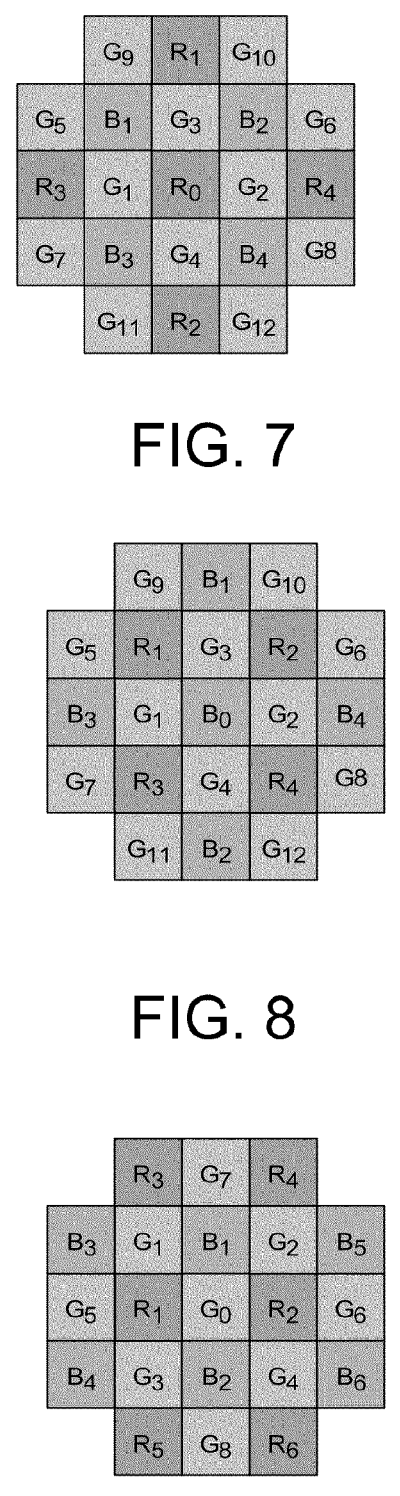

FIG. 7. depicts available pixel values near a Red pixel $R_0$, at the center. In this case, one needs to interpolate the center-pixel Blue and Green values.

FIG. 8. depicts available pixel values near a Blue pixel $B_0$, at the center. In this case, one needs to interpolate the center-pixel Red and Green values.

FIG. 9 depicts available pixel values near a Green pixel $G_0$, at the center, with red horizontal neighbors and blue vertical neighbors. In this case, one needs to interpolate the center-pixel Red and Blue values.

Figure 10:
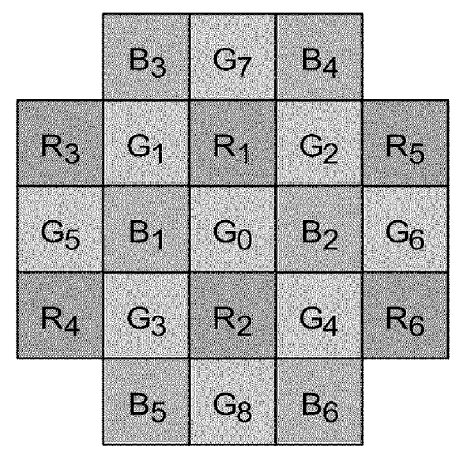

FIG. 10 depicts available pixel values near a Green pixel $G_0$, at the center, with blue horizontal neighbors and red vertical neighbors. In this case, one needs to interpolate the center-pixel Red and Blue values.

Figure 11:
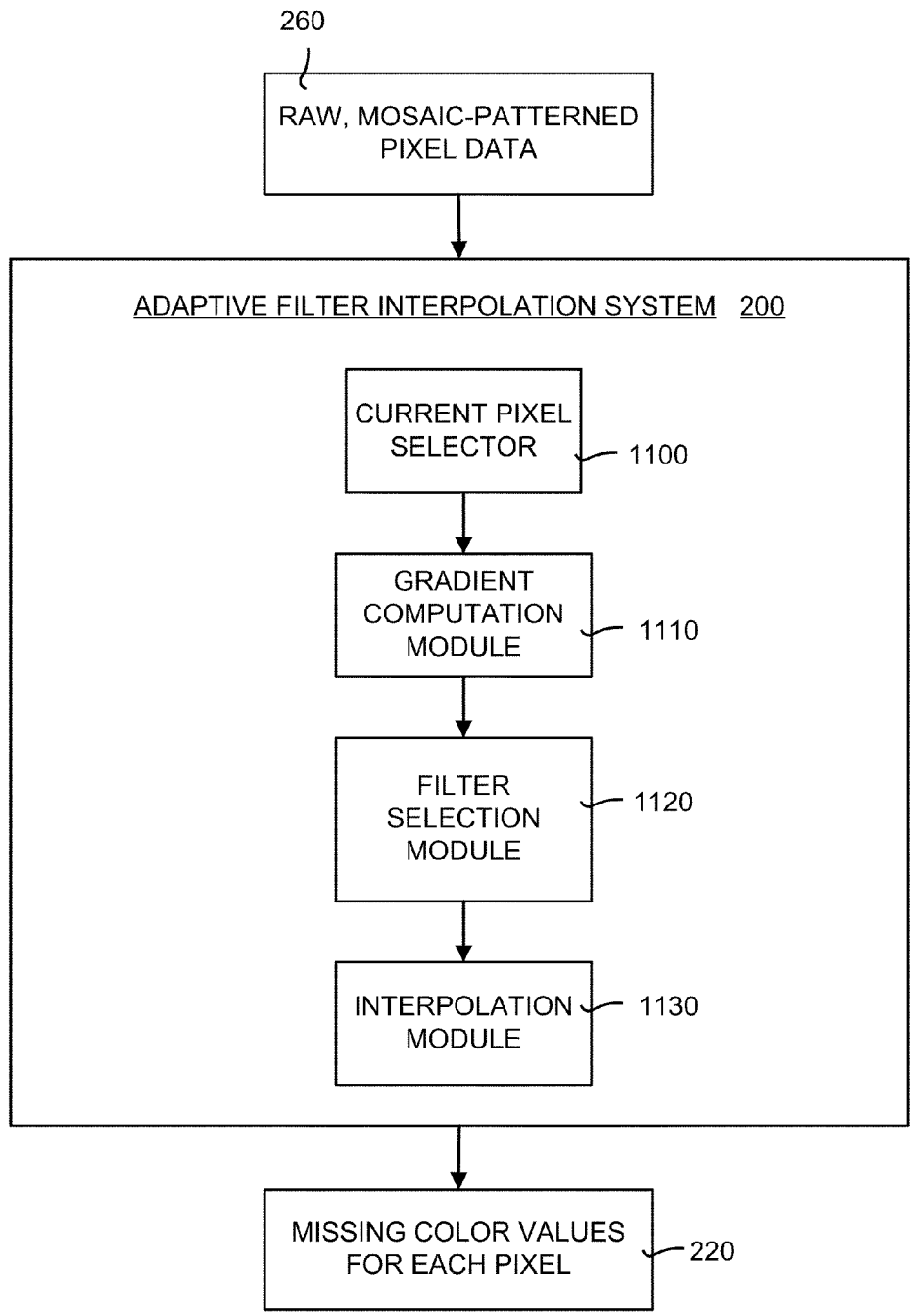

FIG. 11 is a block diagram illustrating the details of the adaptive filter interpolation system shown in FIG. 2.

Figure 12:
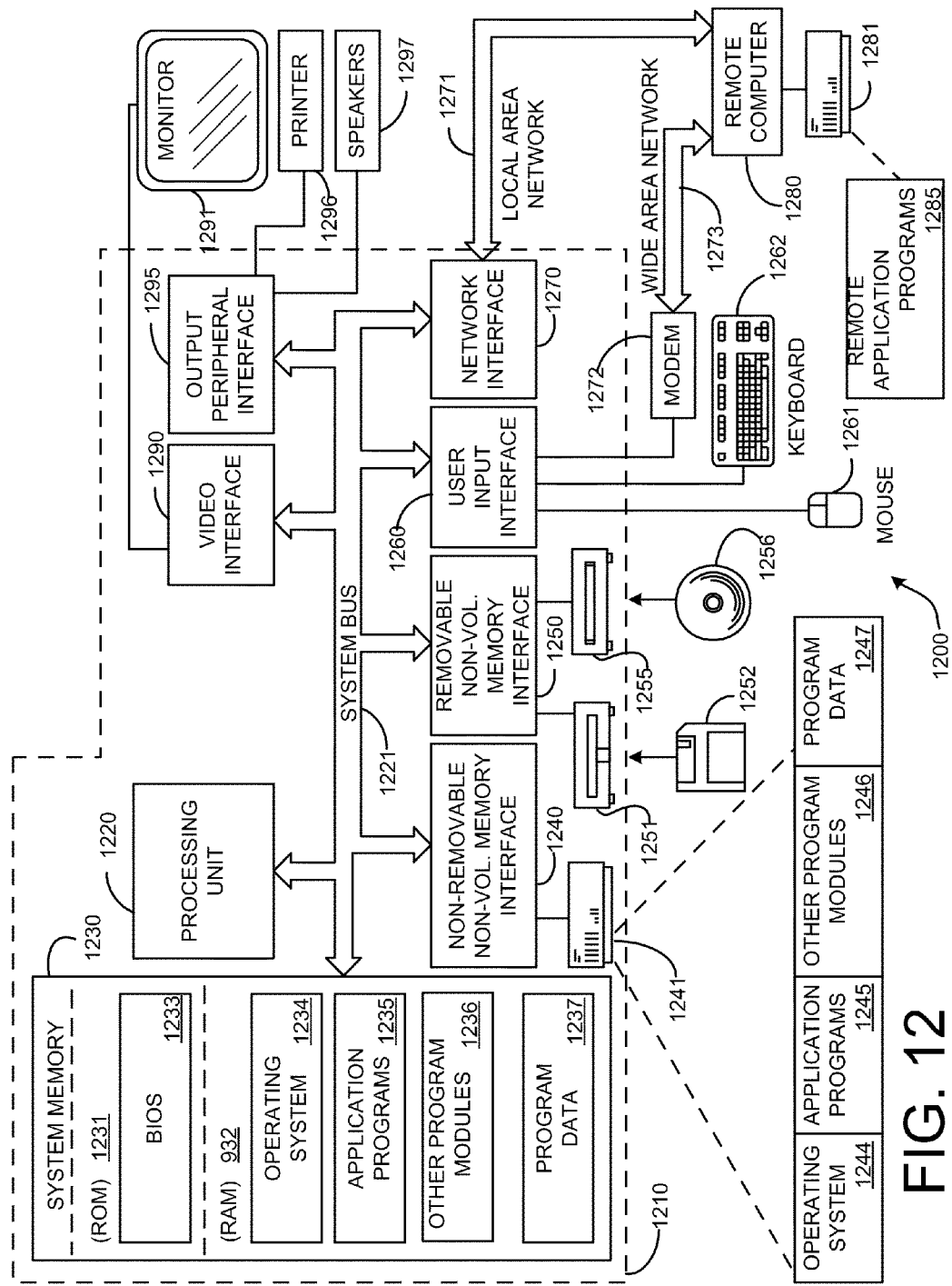

FIG. 12 illustrates an example of a suitable computing system environment in which the adaptive filter interpolation system shown in FIG. 2 can be implemented.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Figure 1:
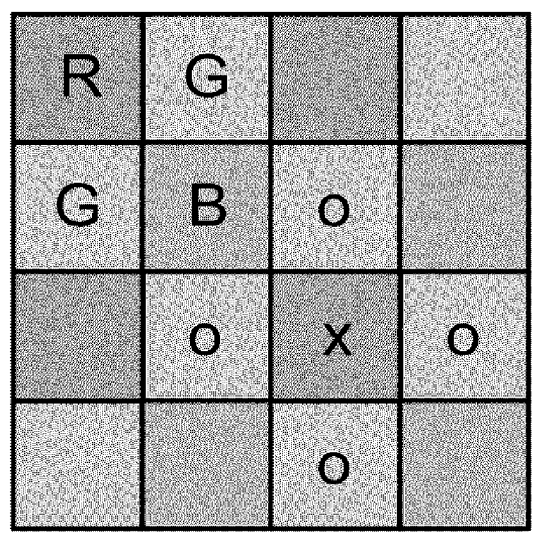

This invention comprises a new algorithm for adaptive interpolation of images produced by digital cameras using a set of linear filters. To reduce cost, almost all digital cameras use a single CCD (charge-coupled device) sensor. To capture the three RGB (red, green, blue) color components, a mosaic-patterned filter is superimposed to the CCD image array, as shown in FIG. 1. For each CCD pixel, only one color is captured, either R, G, or B. Therefore, it is necessary to interpolate the data to generate the other two colors at every pixel. For example, the pixel marked with a 'x' in FIG. 1 is a red pixel, so it has an observed red value. To obtain the green and blue values for that pixel one needs to interpolate the green and blue data available from neighboring pixels. For example, to obtain the green value for the 'x' pixel in FIG. 1, one could perform a bilinear interpolation based on the green pixels marked 'o'. The process of interpolating the missing RGB data captured with a mosaic-patterned CCD color filter array is usually called "demosaicing".

The adaptive filter interpolation system and method of the invention describes an efficient new method to perform high-quality demosaicing. The coefficients of these filters approximate statistically-optimal Wiener filters, and allow fast implementations that use no multiplication operations, just additions and shifts (although multiplications can be used if the processing hardware supports fast multiplications). The interpolated images generated with the algorithm described in the invention surpass the fidelity of most algorithms currently in use. In most general terms, for each pixel to be interpolated, first directional gradients are computed, and the interpolation filters to be used depend on the relative values of such directional gradients.

The adaptive filter interpolation system and method extends the ideas in of a set of linear demosaicing filters described in [10]. One main advantage of this new invention over the previous one is that in this invention the set of filters has been extended to include those in the former invention plus additional ones targeted at interpolation along horizontal and vertical edges. Compared to other nonlinear interpolation algorithms, this adaptive filter interpolation system and method has the advantage that only a single pass is made over the image; all colors are interpolated during that pass. The better performing algorithms described in the references require two passes, one to interpolate green values, and another to interpolate red and blue values. A second pass is needed because the filters for red and blue interpolation use the interpolated green values.

In general, several basic advantageous ideas underlying the adaptive filter interpolation system and method of the invention are:

1. For interpolating missing color data at any particular pixel, one should look at a neighborhood of up to 5×5 pixels, centered around that particular pixel. Bilinear interpolation limits the interpolation filter region of support to a region of 3×3 pixels, but in practice it is quite easy to support a 5×5 region, since buffering 5 scan lines requires just a small amount of memory. In fact, most nonlinear algorithms use a region of support whose size is at least 5×5.

2. For interpolating missing color data at any particular pixel, the value of the color sample that is available at that particular pixel should not be discarded; it should be used to help the interpolation of the other two colors.

3. The interpolation filters should approximate statistically-optimal linear filters (i.e. Wiener filters), but their coefficients should preferably be simple combinations of powers of two, so multiplications can be avoided for processors without built-in multiplication hardware.
4. Three sets of filters should be used: one for horizontal interpolation, one for vertical interpolation, and one for non-directional (and general purpose) interpolation. For each pixel, one decides on which filter to use based on the relative values of horizontal and vertical gradients.
5. The filtering/interpolation steps are constrained to operate sequentially over the pixels of the image, in a single pass. That is because multiple passes can slow down processing time by a factor of 2 or more, because in many applications accessing the memory where the image is stored is a bottleneck.

II. General Overview

Figure 2A:
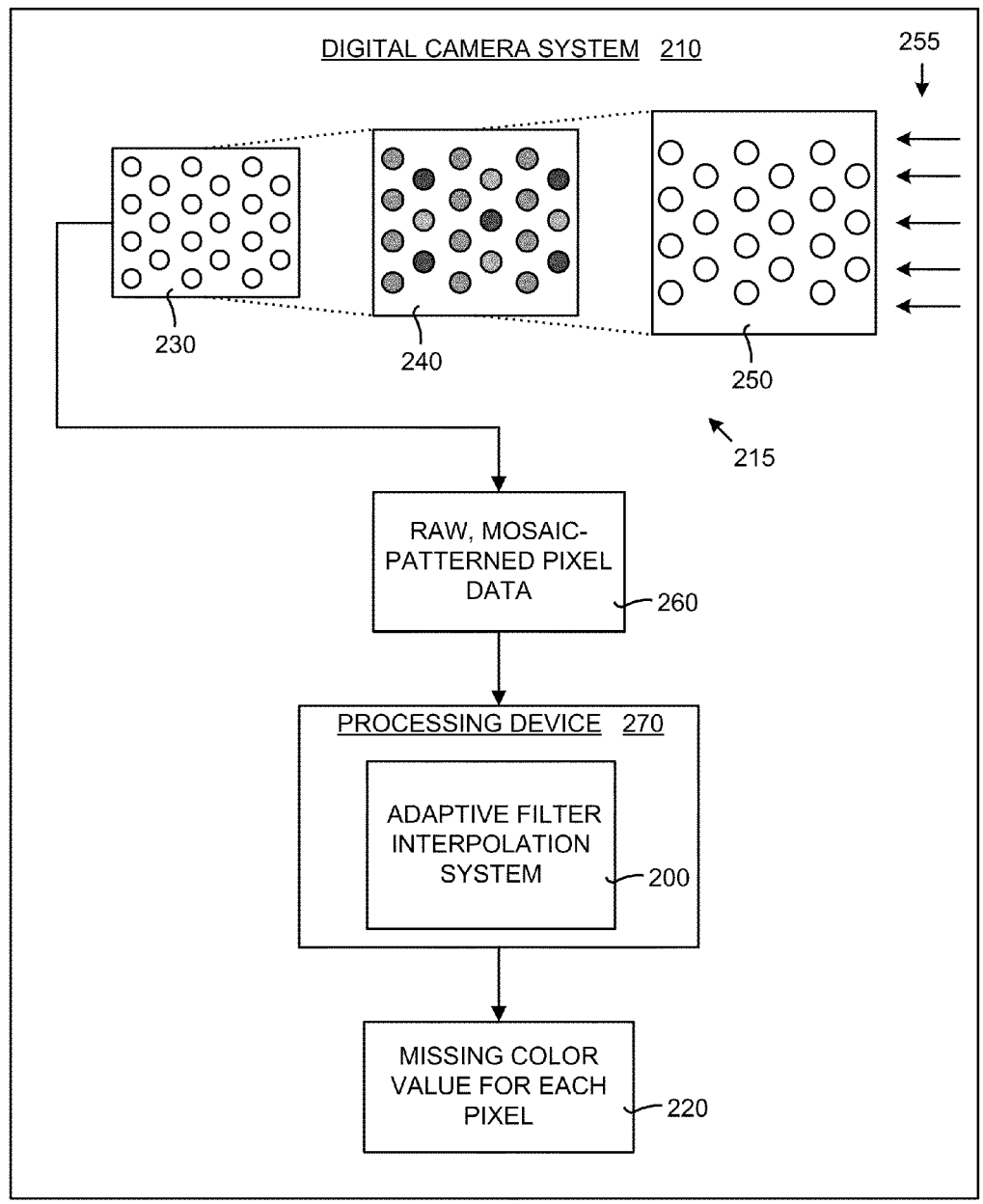
Figure 2B:
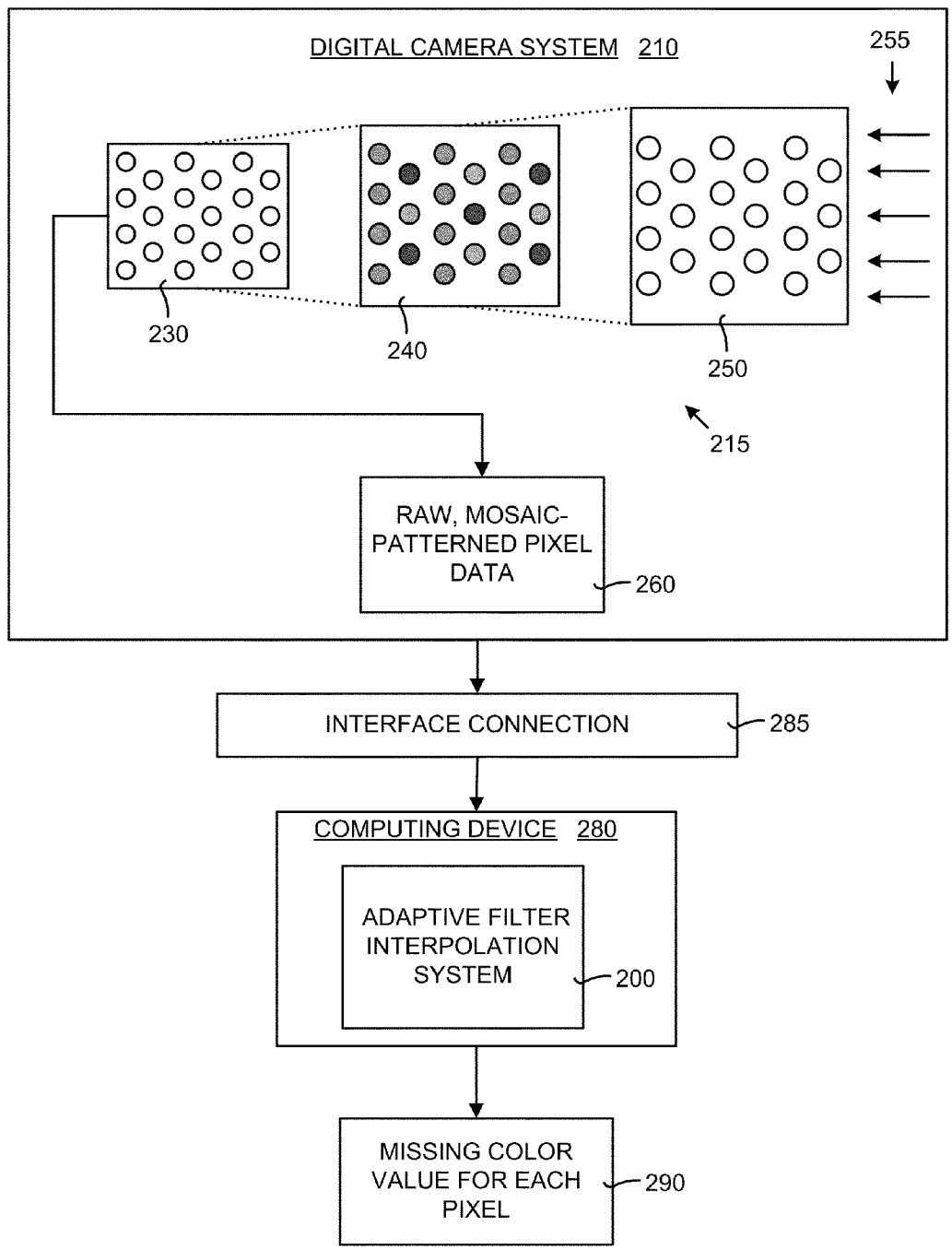

FIGS. 2A and 2B are block diagrams illustrating two exemplary implementations of the adaptive filter interpolation system and method disclosed herein. It should be noted that FIGS. 2A and 2B are merely two of several ways in which the adaptive filter interpolation system and method may implemented and used.

Referring to FIG. 2A, in the first exemplary implementation, the adaptive filter interpolation system 200 resides on a digital camera system 210. In general, the adaptive filter interpolation system 200 uses the adaptive filter interpolation method to process image data that is obtained from an image sensor array 215 and outputs missing color values for each pixel 220. More specifically, as shown in FIG. 2A, the adaptive filter interpolation system 200 is part of the digital camera system 210 and includes the image sensor array 215. The array 215 is made up of a plurality of image sensors (shown by the circles in FIG. 2A), where each image sensor is capable of determining a single color value.

The image sensor array 215 includes a sensor substrate 230, a color filter array (CFA) 240, and a microlens array 250. It should be noted that typically the microlens array 250 is disposed over the CFA 240, which in turn is disposed over the substrate 230, as indicated in FIGS. 2A and 2B by the dashed lines. The light from an image to be captured (not shown) enters the digital camera system 210 (as shown by the arrows 255). The purpose of the microlens array 250 is to focus the incoming light 255 onto each pixel (represented by a single image sensor). The CFA 240 changes the color response of each pixel. The sensor substrate 230 captures the specific color incoming light (as dictated by the CFA 240) and generates an electrical signal. In this manner, the image sensor array 215 samples the incoming light 255 from an image with red, green and blue sensors arranged in the image sensor array 215.

Each pixel in the image sensor array 215 is the output of a red, green or blue sensor. Thus, the sensor output is an electrical signal from each sensor that corresponds to a single color value for each pixel in the image sensor array 215. The output is raw, mosaic-patterned pixel data 260. As mentioned above, in order to display the full color image, color information for red, green and blue colors must be obtained at each pixel. This is achieved by demosaicing, or the interpolating the missing color values in the mosaic-patterned pixel data 260.

The adaptive filter interpolation system 200 use a novel demosaicing technique to interpolate a high-quality estimate of the missing color values. The adaptive filter interpolation system 200 resides on a processing device 270 located on the digital camera system 210. As detailed below, the adaptive filter interpolation system 200 uses the adaptive filter interpolation method to obtain the missing color values at each pixel 220 in the image sensor array 215.

Referring now to FIG. 2B, in the second exemplary implementation the adaptive filter interpolation system 200 resides on a computing device 280. The raw mosaic-patterned pixel data 260 is sent from the digital camera system 210 to the computing device 280. This pixel data 260 typically is sent to the computing device 280 via an interface connection 285, which can be a USB interface, an IEEE 1394 interface, a Bluetooth® interface, or any other interface suitable for carrying the raw pixel data 260 from the digital camera system 210 to the computing device 280. As detailed below, the adaptive filter interpolation system 200 uses the adaptive filter interpolation method to obtain the missing color values at each pixel 290 for use by the computing device 280.

III. Operational Overview

Figure 3:
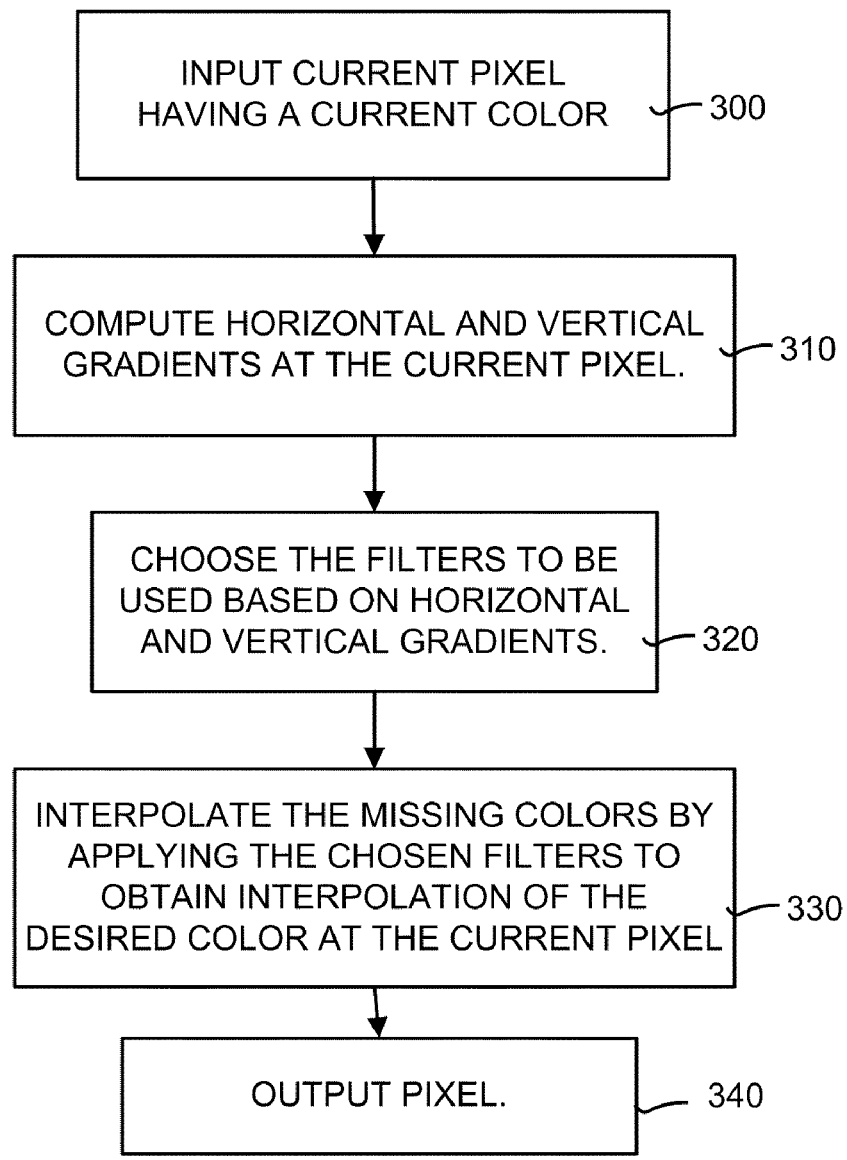

The operation of the adaptive filter interpolation system 200 and method used therein shown in FIG. 2 now will be discussed. FIG. 3 is a general flow diagram illustrating the general operation of the adaptive filter interpolation system shown in FIG. 2. The adaptive filter interpolation method begins by inputting a current pixel from a color image (box 300). The current pixel has an associated current color. Namely, the current color is the color that the image sensor of the current pixel is filtered to receive. Next, for each given pixel location, the horizontal and vertical gradients (whose computation depends on the available color for that pixel and its location in the image) are computed (box 310). Using the computed horizontal and vertical gradients the appropriate interpolation filters are chosen from a small set of predetermined filters (box 320). Then, the chosen filters are applied to interpolate the missing data (box 330). In other words, any of the missing colors at the current pixel are interpolated or estimated. By way of example, if the current color is green, then the desired color may be red or blue.

IV. Operational Details and Working Example

Figure 4:
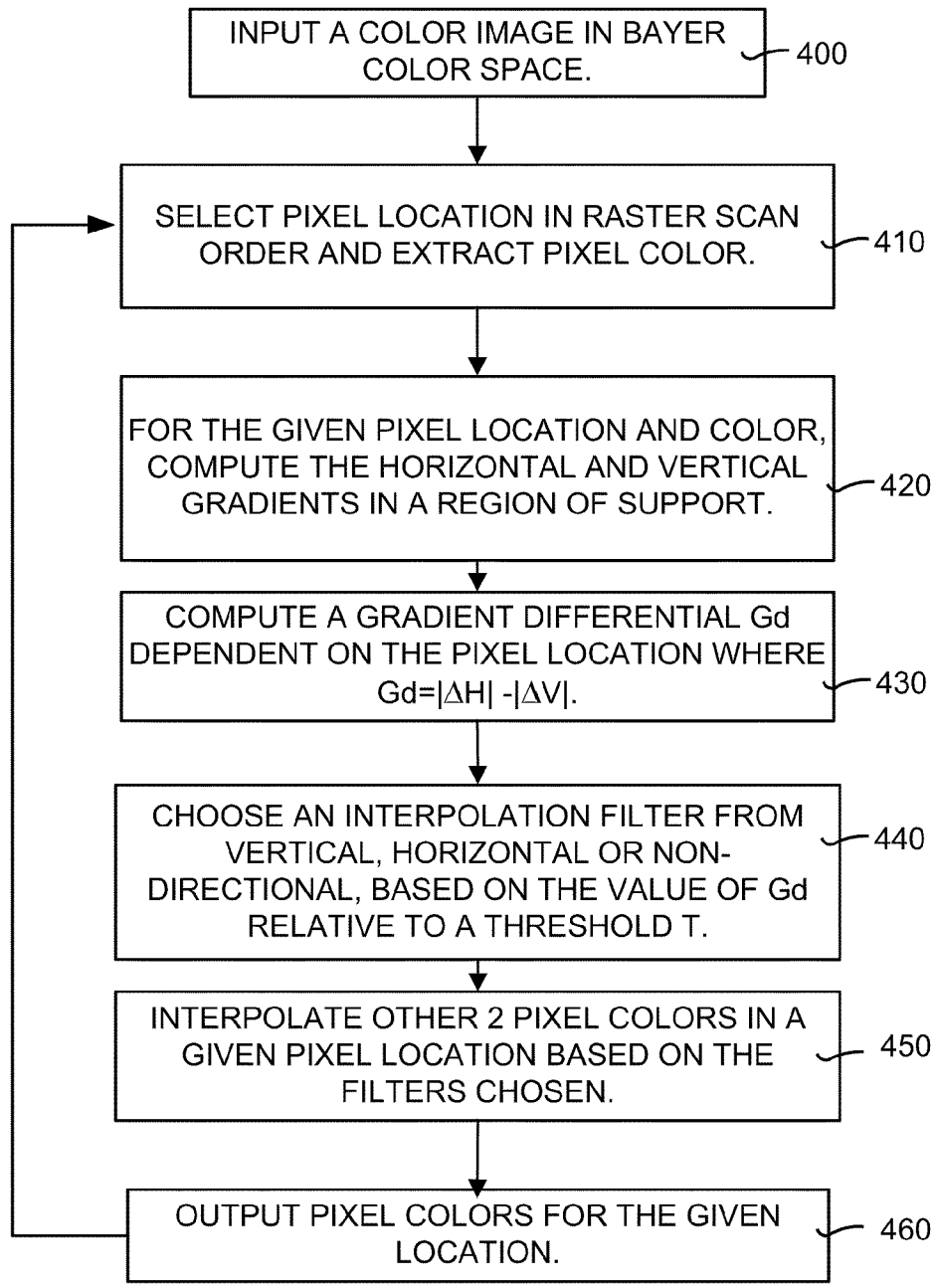
Figure 5:
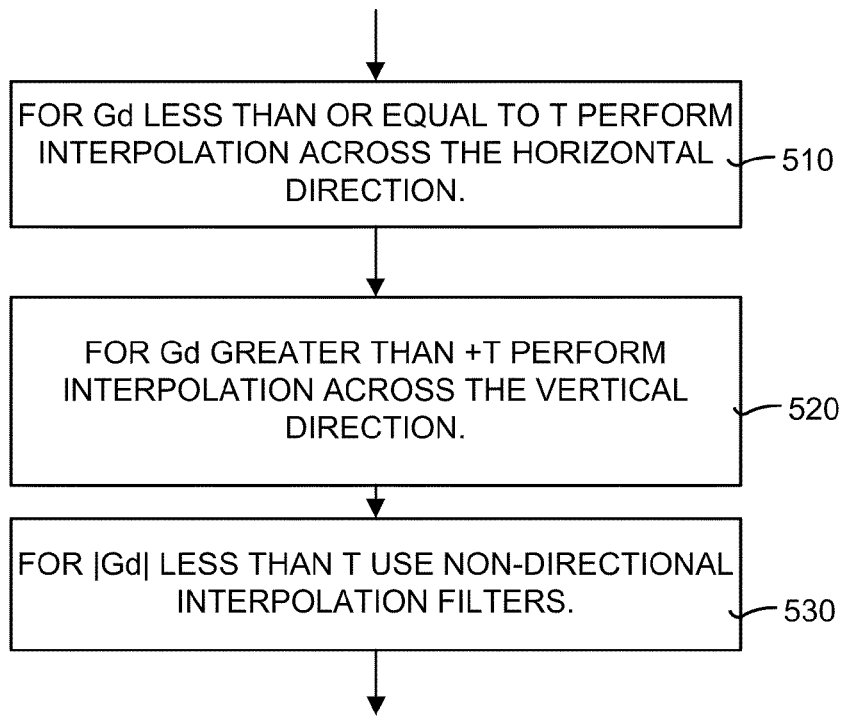

FIG. 4 is a general flow diagram illustrating a more detailed process than is described in FIG. 3. In particular, an image in Bayer (mosaiced) format is input (box 400). A pixel location is selected based on raster scan order and its pixel color is extracted (box 410). Next, for the given pixel location, the horizontal and vertical gradients are computed by employing a region of support around the pixel location (box 420). The region of support is defined as a size of a pixel neighborhood whose color values are considered for computations associated with any given pixel, such as the current pixel. A gradient differential, $G_d$, dependent on the pixel location is then computed (box 430). This gradient differential is computed using the current pixel (having a current color and pixel location) and pixels within the region of support. The gradient-differential, $G_d$, is then compared to a threshold T and the interpolation filters are selected based on how the gradient differential compares to threshold T (box 440). More specifically, as shown in FIG. 5, If $G_d < -T$, use filters that perform interpolation across the horizontal direction (box 510).

If $G_d > +T$, use filters that perform interpolation across the vertical direction (box 520).

If $|G_d| < T$, use the linear filters described in [10] and the co-pending patent application entitled "HIGH-QUALITY GRADIENT-CORRECTED LINEAR INTERPOLATION FOR DEMOSAICING OF COLOR IMAGES" filed on Mar. 15, 2004 and assigned Ser. No. 10/801,450, i.e. the same filters as in [10]. (box 530)

Referring again to FIG. 4, the other two colors in a given pixel location are also interpolated based on the chosen filters (box 450) and the pixel colors for that location are output (box 460). This process is then repeated for each pixel location in the input image so as to output all interpolated colors in one pass.

With respect to the interpolation filters chosen, as mentioned above, if $|Gd|<T$, the linear filters described [10] and in the aforementioned co-pending patent application are used. This third case will now briefly be described. Specifically, in this third case, this gradient-corrected linear interpolation method described in [10] and the co-pending patent application includes computing an interpolation of a desired color at a current pixel having a current color, where the desired color is used in the interpolation. Next, a correction term is computed using the current color. The correction term then is linearly combined with the interpolation to obtain a corrected interpolation of the desired color at the current pixel. Preferably, in order to simplify computation and preserve computing resources, the interpolation is a bilinear interpolation. However, the interpolation may be virtually any one of the available prior art demosaicing techniques, including linear and nonlinear interpolations. The correction term is preferably a gradient correction term computed from the current color of the current pixel. The gradient-corrected linear interpolation method computes a gradient at each pixel by using the color value of that pixel and the values of the neighboring pixels. A fixed portion (preferably controlled by a gain factor) of that gradient value then is added to the interpolated value of the missing colors. The gradient correction term is linearly combined with the interpolation. Preferably, the gradient correction term is added to the interpolation to improve the estimate of the desired color. The gradient-corrected linear interpolation method also includes applying a gradient-correction gain to the gradient correction term. This gradient-correction gain affects the amount of gradient correction that is applied to the interpolation. The gradient-correction gain can be selected in a variety of ways. The optimal gradient-correction gain is computed by minimization a mean-squared error. An approximation to this optimal value allows computations using integer arithmetic, no division operations, or both. The gradient-correction may also be selected based on characteristics of the color image sensor or characteristics of an entire digital camera system. The gradient-correction gain may also be varied within the image, if so desired, based on statistics of the color image. These statistics may include the global statistics of the image, the local statistics of the image, or both.

In order to more fully understand the adaptive filter interpolation method and system disclosed herein, the operational details of an exemplary working example are presented. It should be noted that this working example is only one way in which the adaptive filter interpolation method and system may be implemented.

A. Exemplary Embodiment

The previous demosaicing algorithm [10] was aimed at fast computation. It defines a set a near-optimal linear (fixed) filters, in the sense of approximating closely optimal linear Bayesian estimators (i.e. Wiener filters). While performing better than most non-linear algorithms in terms of mean-square error (MSE, measured with respect to the reference 3-CCD image), the linear demosaicing in [10] still has color fringing artifacts ("zipper" effects [2]) near edges. In the adaptive filter interpolation system and method of the present invention, the adaptive filter interpolation system and method essentially removes the zipper effects by choosing the interpolation filters so that they are aligned with edges in the image. For example, in a region near a horizontal edge (a large gradient in the pixel values in the vertical direction), one chooses interpolation filters with coefficients mostly in a horizontal pattern. That way one avoids interpolating across an edge. Analogously, in a region near a vertical edge, one interpolates in the vertical direction.

Specifically, the adaptive filter interpolation system and method scans the pixels in raster-scan order, and for each pixel it performs two steps: 1) gradient differential computation; and 2) interpolation, as described below.

1) Step 1: Gradient Differential Computation

First, a gradient differential $G_d$ is computed, where $$G_d = |\Delta H| - |\Delta V|$$

where $\Delta_H$ denotes the gradient in the horizontal direction and $\Delta_V$ denotes the gradient in the vertical direction, and $|\cdot|$ denotes magnitude (or absolute value). The formulas for computing the gradients depend on which pixel location within the Bayer pattern is being computed, as described below.

2) Step 2: Interpolation

Then, interpolation for the two missing colors is computed via linear filters, but the choice of filters is dependent on Gd, according to the following rule:

If $G_d < -T$, use filters that perform interpolation across the horizontal direction.

If $G_d > +T$, use filters that perform interpolation across the vertical direction.

If $|G_d| < T$, use the old linear filters described in [10], i.e. the same filters as in [10] and co-pending application Ser. No. 10/801,450.

Parameter T is a threshold that controls how aggressive is the decision to interpolate along an edge. The smaller the value of T, the more likely one is to switch from a non-directional filter to a horizontally- or vertically-aligned filter.

The main advantages of this process over the well-known Hamilton-Adams method [7] (and others) are reduced computational complexity and better filtering performance. The differentiating aspects are:

Single pass over the whole image: While the Hamilton-Adams (and most other non-linear methods) interpolates the green pixels first, in the adaptive filter interpolation method of the invention all missing channels are computed together. Specifically, for interpolating the B value in an R pixel, for example, the Hamilton-Adams method needs the interpolated values of G in a neighborhood around the R pixel, where in the adaptive filter interpolation method one only needs the interpolated G at that pixel. Thus, one can perform all interpolations in a single pass over the image.

Introduction of a dead-zone for linear filtering: The adaptive filter interpolation method above requires that the magnitude of the gradient delta, $G_d$, reaches the threshold T for directional filtering to take place. That has a significant impact on improving mean square error (MSE), and reduces the generation of artifacts in some textured areas and diagonal edges.

Use of near-optimal linear filters: The adaptive filter interpolation method uses near optimal linear filters [10] for pixels in which $|G_d|$ is below the threshold T.

To completely specify the interpolation process, the interpolation formulas for each of the four possible pixel positions in a Bayer array are now defined. For each case, one must specify four formulas: one for the gradient computation, and one for each of the horizontal, vertical, and non-directional filters.

Note: by non-directional we mean filters that do not put more weight in either horizontal or vertical directions; thus, they are useful for diagonal edges and also for generic textures where no edge is present.

FIG. 6A depicts filter coefficients for the adaptive demosaicing method of the invention, for Red and Blue locations. The notation B=( )/4, for example, means that the final Blue value is obtained by adding the pixel values multiplied by the indicated coefficients, and then dividing the result by 4. Note that divisions by 4 and 8 can be efficiently implemented via shifts. The filter coefficients for green pixel locations are shown in FIG. 6B.

1. Interpolation at Red Locations

Red locations are the locations such as the one marked with an X in the top left of FIG. 6A. We call $R_0$ the Red value for center pixel, and label the neighboring available pixel values as shown in FIG. 7.

First, the gradient computation formulas are defined as:

$$\Delta_H = G_2 - G_1$$

$$\Delta_V = G_4 - G_3$$

Now, one defines the horizontal interpolation filter for Green:

$$G_0 = \frac{1}{2}[G_1+G_2] + a_1[2R_0 - R_3 - R_4]$$

where the first term is a bilinear interpolation for the horizontal direction only, and the second term is a horizontal correction based on a Red gradient. In a preferred embodiment, a good value for the first correction gain parameter is $a_1 = \frac{1}{4}$.

The horizontal interpolation filter for Blue is given by:

$$B_0 = G_0 + C_{B-G}$$

where the correction factor $C_{B-G}$ is computed as $$C_{B-G} = \frac{1}{4}[B_1+B_2-G_3-\frac{1}{2}(G_5+G_6)] + \frac{1}{4}[B_3+B_4-G_4-\frac{1}{2}(G_7+G_8)]$$

Note that the formula above is written in a way as to clearly identify two delta-color gradient terms: the first term corresponding to a horizontal gradient operator for pixels above the center pixel, and the second term corresponding to a horizontal gradient operator for pixels below the center pixel. By regrouping terms, an equivalent formula can be used for faster computation, for example $$C_{B-G} = \frac{1}{4}[B_1+B_2+B_3+B_4-G_3-G_4-\frac{1}{2}(G_5+G_6+G_7+G_8)]$$

Now the vertical interpolation filter for Green is defined as:

$$G_0 = \frac{1}{2}[G_3+G_4] + a_2[2R_0 - R_1 - R_2]$$

In a preferred embodiment, a good value for the second correction gain parameter is $a_2 = \frac{1}{4}$.

The vertical interpolation filter for Blue is given by:

$$B_0 = G_0 + C_{B-G}$$

with $$C_{B-G} = \frac{1}{4}[B_1+B_3-G_1-\frac{1}{2}(G_9+G_{11})] + \frac{1}{4}[B_2+B_4-G_2-\frac{1}{2}(G_{10}+G_{12})]$$

or, equivalently, $$C_{B-G} = \frac{1}{4}[B_1+B_2+B_3+B_4-G_1-G_2-\frac{1}{2}(G_9+G_{10}+G_{11}+G_{12})]$$

Now the diagonal or non-directional interpolation filter for Green is defined as:

$$G_0 = \frac{1}{4}[G_1+G_2+G_3+G_4] + a_3[4R_0 - R_1 - R_2 - R_3 - R_4]$$

and the diagonal or non-directional interpolation filter for Blue:

$$B_0 = \frac{1}{4}[B_1+B_2+B_3+B_4] + a_4[R_0 - \frac{1}{4}(R_1+R_2+R_3+R_4)]$$

In a preferred embodiment, good values for the third and fourth correction gain parameters are $a_3 = \frac{1}{8}$ and $a_4 = \frac{3}{4}$.

Note that the interpolated values $G_0$ and $B_0$ complement the known value $R_0$ to determine the full RGB values for the current pixel of interest, i.e. the pixel at the center in FIG. 7.

2. Interpolation at Blue Locations

The blue locations are the locations such as the one marked with an X in the bottom left of FIG. 6A. We call $B_0$ the Blue value for center pixel, and label the neighboring available pixel values as shown in FIG. 8.

First, the gradient computation formulas are defined:

$$\Delta_H = G_2 - G_1$$

$$\Delta_V = G_4 - G_3$$

Now the horizontal interpolation filter for Green is defined:

$$G_0 = \frac{1}{2}[G_1+G_2] + b_1[2B_0 - B_3 - B_4]$$

where the first term is a bilinear interpolation for the horizontal direction only, and the second term is a horizontal correction based on a Red gradient. In a preferred embodiment, a good value for the first correction gain parameter is $b_1 = \frac{1}{4}$.

The horizontal interpolation filter for Red is given by:

$$R_0 = G_0 + C_{R-G}$$

where the correction factor $C_{R-G}$ is computed as $$C_{R-G} = \frac{1}{4}[R_1+R_2-G_3-\frac{1}{2}(G_5+G_6)] + \frac{1}{4}[R_3+R_4-G_4-\frac{1}{2}(G_7+G_8)]$$

or, equivalently as $$C_{R-G} = \frac{1}{4}[R_1+R_2+R_3+R_4-G_3-G_4-\frac{1}{2}(G_5+G_6+G_7+G_8)]$$

Now the vertical interpolation filter for Green is defined as:

$$G_0 = \frac{1}{2}[G_3+G_4] + b_2[2B_0 - B_1 - B_2]$$

In a preferred embodiment, a good value for the second correction gain parameter is $b_2 = \frac{1}{4}$.

The vertical interpolation filter for Red is given by:

$$R_0 = G_0 + C_{R-G}$$

with $$C_{R-G} = \frac{1}{4}[R_1+R_3-G_1-\frac{1}{2}(G_9+G_{11})] + \frac{1}{4}[R_2+R_4-G_2-\frac{1}{2}(G_{10}+G_{12})]$$

or, equivalently, $$C_{R-G} = \frac{1}{4}[R_1+R_2+R_3+R_4-G_1-G_2-\frac{1}{2}(G_9+G_{10}+G_{11}+G_{12})]$$

Now the diagonal or non-directional interpolation filter for Green is defined as:

$$G_0 = \frac{1}{4}[G_1+G_2+G_3+G_4] + b_3[4B_0 - B_1 - B_2 - B_3 - B_4]$$

and the diagonal or non-directional interpolation filter for Red:

$$R_0 = \frac{1}{4}[R_1+R_2+R_3+R_4] + b_4[B_0 - \frac{1}{4}(B_1+B_2+B_3+B_4)]$$

In a preferred embodiment, good values for the third and fourth correction gain parameters are $b_3 = \frac{1}{8}$ and $b_4 = \frac{3}{4}$.

Note that the interpolated values $G_0$ and $R_0$ complement the known value $B_0$ to determine the full RGB values for the current pixel of interest, i.e. the pixel at the center in FIG. 8.

Using the preferred values for the correction gain parameters, for the cases I and II one gets the interpolation filters shown in FIG. 6A.

3. Interpolation at Green Locations in a Red Row and Blue Column

The green locations are the locations such as the one marked with an X in the top left of FIG. 6B. We call $G_0$ the Green value for center pixel, and label the neighboring available pixel values as shown in FIG. 9.

First, the gradient computation formulas are defined. There are three options: the first is to use just the two immediate pixels in each direction, as in the previous two cases, namely:

$$\Delta_H = R_2 - R_1$$

$$\Delta_V = B_2 - B_1$$

The formulas above are simple, but have the disadvantage of measuring the gradient via Red and Blue pixel values. In the first two cases (Interpolation at Red and Blue locations), gradients were computed from Green pixels. That is appropriate because in most cases edges are more defined in the Green channel.

A second alternative formula for computing the horizontal and vertical gradients around $G_0$, using only Green pixel values, is $$\Delta_H = \frac{1}{2}[(G_2 - G_1) + (G_4 - G_3)]$$

$$\Delta_V = \frac{1}{2}[(G_3 - G_1) + (G_4 - G_2)]$$

The formula above produces better results, because it uses only Green pixel values.

A third alternative formula for computing the horizontal and vertical gradients around $G_0$, using only Green pixel values, considers the fact that one needs only the magnitude of the gradients to compute the gradient differential $G_D$:

$$|\Delta_H| = \frac{1}{2}[|G_2 - G_1| + |G_4 - G_3|]$$

$$|\Delta_V| = \frac{1}{2}[|G_3 - G_1| + |G_4 - G_2|]$$

This third formula produces even better results in practice.

Now the horizontal interpolation filter for Red is defined as:

$$R_0 = \frac{1}{2}[R_1 + R_2] + c_1[2G_0 - G_5 - G_6]$$

where the first term is a bilinear interpolation for the horizontal direction only, and the second term is a horizontal correction based on a Green gradient. In a preferred embodiment, a good value for the first correction gain parameter is $c_1 = \frac{1}{4}$.

The horizontal interpolation filter for Blue is given by:

$$B_0 = G_0 + C_{B-G}$$

(note that $G_0$ is a known value, not an interpolated one) where the correction factor $C_{B-G}$ is computed as $$C_{B-G} = \frac{1}{4}[2B_1 - G_1 - G_2] - \frac{1}{4}[2B_2 - G_3 - G_4]$$

An alternative formula for $C_{B-G}$ that leads to better results is $$C_{B-G} = \frac{1}{4}[B_1 + \frac{1}{2}(B_3+B_5) - G_1 - G_2] + \frac{1}{4}[B_2 + \frac{1}{2}(B_4+B_6) - G_3 - G_4]$$

or, equivalently, $$C_{B-G} = \frac{1}{4}[B_1 + B_2 + \frac{1}{2}(B_3+B_5+B_4+B_6) - (G_1+G_2+G_3+G_4)]$$

Now the vertical interpolation filter for Red is defined as:

$$R_0 = G_0 + C_{R-G}$$

where the correction factor $C_{R-G}$ is computed as $$C_{R-G} = \frac{1}{4}[2R_1 - G_1 - G_3] - \frac{1}{4}[2R_2 - G_2 - G_4]$$

An alternative formula for $C_{B-G}$ that leads to better results is $$C_{R-G} = \frac{1}{4}[R_1 + \frac{1}{2}(R_3+R_5) - G_1 - G_3] + \frac{1}{4}[R_2 + \frac{1}{2}(R_4+R_6) - G_2 - G_4]$$

or, equivalently, $$C_{R-G} = \frac{1}{4}[R_1 + R_2 + \frac{1}{2}(R_3+R_5+R_4+R_6) - (G_1+G_2+G_3+G_4)]$$

The vertical interpolation filter for Blue is given by:

$$B_0 = \frac{1}{2}[B_1 + B_2] + c_2[2G_0 - G_7 - G_8]$$

In a preferred embodiment, a good value for the second correction gain parameter is $c_2 = \frac{1}{4}$.

Now the diagonal or non-directional interpolation filter for Red is defined as:

$$R_0 = \frac{1}{2}[R_1 + R_2] + \frac{1}{8}[c_3 G_0 - c_4(G_1+G_2+G_3+G_4+G_5+G_6) + c_5(G_7+G_8)]$$

and the diagonal or non-directional interpolation filter for Blue:

$$B_0 = \frac{1}{2}[B_1 + B_2] + \frac{1}{8}[c_3 G_0 - c_4(G_1+G_2+G_3+G_4+G_7+G_8) + c_5(G_5+G_6)]$$

In a preferred embodiment, good values for the third, fourth, and fifth correction gain parameters are $c_3 = 5$, $c_4 = 1$, and $c_5 = \frac{1}{2}$.

Note that the interpolated values $R_0$ and $B_0$ complement the known value $G_0$ to determine the full RGB values for the current pixel of interest, i.e. the pixel at the center in FIG. 9.

4. Interpolation at Green Locations in a Blue Row and Red Column

Green locations in a blue row and a red column are the locations such as the one marked with an X in the top left of FIG. 6B. We call $G_0$ the Green value for center pixel, and label the neighboring available pixel values as shown in FIG. 9.

First the gradient computation formulas are defined. There are three options: the first is to use just the two immediate pixels in each direction, as in the previous two cases, namely:

$$\Delta_H = B_2 - B_1$$

$$\Delta_V = R_2 - R_1$$

A second alternative formula for computing the horizontal and vertical gradients around $G_0$ is:

$$\Delta_H = \frac{1}{2}[(G_2 - G_1) + (G_4 - G_3)]$$

$$\Delta_V = \frac{1}{2}[(G_3 - G_1) + (G_4 - G_2)]$$

The formula above produces better results, because it uses only Green pixel values.

A third alternative formula for computing the horizontal and vertical gradients around $G_0$, using only Green pixel values, considers the fact that we need only the magnitude of the gradients to compute the gradient differential $G_D$:

$$|\Delta_H| = \frac{1}{2}[|G_2 - G_1| + |G_4 - G_3|]$$

$$|\Delta_V| = \frac{1}{2}[|G_3 - G_1| + |G_4 - G_2|]$$

This third formula produces even better results in practice.

Now the horizontal interpolation filter for Blue is defined as:

$$B_0 = \frac{1}{2}[B_1 + B_2] + d_1[2G_0 - G_5 - G_6]$$

where the first term is a bilinear interpolation for the horizontal direction only, and the second term is a horizontal correction based on a Green gradient. In a preferred embodiment, a good value for the first correction gain parameter is $d_1 = \frac{1}{4}$.

The horizontal interpolation filter for Red is given by:

$$R_0 = G_0 + C_{R-G}$$

where the correction factor $C_{R-G}$ is computed as $$C_{R-G} = \frac{1}{4}[2R_1 - G_1 - G_2] - \frac{1}{4}[2R_2 - G_3 - G_4]$$

An alternative formula for $C_{R-G}$ that leads to better results is $$C_{R-G} = \frac{1}{4}[R_1 + \frac{1}{2}(R_3 + R_5) - G_1 - G_2] - \frac{1}{4}[R_2 + \frac{1}{2}(R_4 + R_6) - G_3 - G_4]$$

or, equivalently, $$C_{R-G} = \frac{1}{4}[R_1 + R_2 + \frac{1}{2}(R_3 + R_5 + R_4 + R_6) - (G_1 + G_2 + G_3 + G_4)]$$

Now the vertical interpolation filter for Blue is defined as:

$$B_0 = G_0 + C_{B-G}$$

where the correction factor $C_{R-G}$ is computed as $$C_{B-G} = \frac{1}{4}[2B_1 - G_1 - G_3] - \frac{1}{4}[2B_2 - G_2 - G_4]$$

An alternative formula for $C_{B-G}$ that leads to better results is $$C_{B-G} = \frac{1}{4}[B_1 + \frac{1}{2}(B_3 + B_5) - G_1 - G_3] - \frac{1}{4}[B_2 + \frac{1}{2}(B_4 + B_6) - G_2 - G_4]$$

or, equivalently, $$C_{B-G} = \frac{1}{4}[B_1 + B_2 + \frac{1}{2}(B_3 + B_5 + B_4 + B_6) - (G_1 + G_2 + G_3 + G_4)]$$

The vertical interpolation filter for Red is given by:

$$R_0 = \frac{1}{2}[R_1 + R_2] + d_2[2G_0 - G_7 - G_8]$$

In a preferred embodiment, a good value for the second correction gain parameter is $d_2 = \frac{1}{4}$.

Now the diagonal interpolation filter for Blue is defined as:

$$B_0 = \frac{1}{2}[B_1 + B_2] + \frac{1}{8}[d_3 G_0 - d_4(G_1 + G_2 + G_3 + G_4 + G_5 + G_6) + d_5(G_7 + G_8)]$$

and the diagonal or non-directional interpolation filter for Red:

$$R_0 = \frac{1}{2}[R_1 + R_2] + \frac{1}{8}[d_3 G_0 - d_4(G_1 + G_2 + G_3 + G_4 + G_7 + G_8) + d_5(G_5 + G_6)]$$

In a preferred embodiment, good values for the third, fourth, and fifth correction gain parameters are $d_3 = 5$, $d_4 = 1$, and $d_5 = \frac{1}{2}$.

Note that the interpolated values $R_0$ and $B_0$ complement the known value $G_0$ to determine the full RGB values for the current pixel of interest, i.e. the pixel at the center in FIG. 10.

Using the preferred values for the correction gain parameters, for the cases III and IV one gets the interpolation filters shown in FIG. 6B.

V. System Components

The adaptive filter interpolation system 200 shown in FIGS. 2A and 2B includes a number of program modules that allow the system 300 to produce a high-quality interpolation of missing color at a pixel in a quick, simple and efficient manner. FIG. 11 is a block diagram illustrating the details of the adaptive filter interpolation system 200 shown in FIG. 2. The program modules contained in the system 200 now will be discussed.

In general, referring to FIG. 11, the adaptive filter interpolation system 200 inputs color information including the raw, mosaic-patterned pixel data 260 produced by the image sensor array 215, processes the information, and outputs one or more missing color values for each pixel 220. More specifically, the adaptive filter interpolation system 200 includes a current pixel selector 1100 that selects a current pixel having a current color from the image sensor array that represents a color image. A gradient computation module 1110 computes the gradient in the horizontal and vertical directions and computes the gradient differential $G_d$. The filter selection module 1120 then compares $G_d$ to a threshold T and selects the appropriate filter based on this comparison. The interpolation module 1130 computes an interpolation of the missing color values at the current pixel. The interpolation uses pixels with a region of support.

V. Exemplary Operating Environment

The adaptive filter interpolation method and system are designed to operate in a computing environment and on a computing device, such as the processing device 270 contained in the digital camera system 210 or in the computing device 280. The computing environment in which the adaptive filter interpolation method and system operates will now be discussed. The following discussion is intended to provide a brief, general description of a suitable computing environment in which the adaptive filter interpolation method and system may be implemented.

FIG. 12 illustrates an example of a suitable computing system environment in which the adaptive filter interpolation method and system shown in FIG. 2 may be implemented. The computing system environment 1200 is only one example of a suitable computing environment and is not intended to suggest any limitation as to the scope of use or functionality of the invention. Neither should the computing environment 1200 be interpreted as having any dependency or requirement relating to any one or combination of components illustrated in the exemplary operating environment 1200.

The adaptive filter interpolation method and system is operational with numerous other general purpose or special purpose computing system environments or configurations. Examples of well known computing systems, environments, and/or configurations that may be suitable for use with the adaptive filter interpolation method and system include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The adaptive filter interpolation method and system may be described in the general context of computer-executable instructions, such as program modules, being executed by a computer. Generally, program modules include routines, programs, objects, components, data structures, etc., that perform particular tasks or implement particular abstract data types. The gradient-corrected linear interpolation method and system may also be practiced in distributed computing environments where tasks are performed by remote processing devices that are linked through a communications network. In a distributed computing environment, program modules may be located in both local and remote computer storage media including memory storage devices. With reference to FIG. 12, an exemplary system for implementing the gradient-corrected linear interpolation method and system includes a general-purpose computing device in the form of a computer 1210.

Components of the computer 1210 may include, but are not limited to, a processing unit 1220, a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1210 typically includes a variety of computer readable media. Computer readable media can be any available media that can be accessed by the computer 1210 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1210. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within the computer 1210, such as during start-up, is typically stored in ROM 931. RAM 1232 typically contains data and/or program modules that are immediately accessible to and/or presently being operated on by processing unit 1220. By way of example, and not limitation, FIG. 12 illustrates operating system 1234, application programs 1235, other program modules 1236, and program data 1237.

The computer 1210 may also include other removable/non-removable, volatile/nonvolatile computer storage media. By way of example only, FIG. 12 illustrates a hard disk drive 1241 that reads from or writes to non-removable, nonvolatile magnetic media, a magnetic disk drive 1251 that reads from or writes to a removable, nonvolatile magnetic disk 1252, and an optical disk drive 1255 that reads from or writes to a removable, nonvolatile optical disk 1256 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1241 is typically connected to the system bus 1221 through a non-removable memory interface such as interface 1240, and magnetic disk drive 1251 and optical disk drive 1255 are typically connected to the system bus 1221 by a removable memory interface, such as interface 1250.

The drives and their associated computer storage media discussed above and illustrated in FIG. 12, provide storage of computer readable instructions, data structures, program modules and other data for the computer 1210. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237. Operating system 1244, application programs 1245, other program modules 1246, and program data 1247 are given different numbers here to illustrate that, at a minimum, they are different copies. A user may enter commands and information into the computer 1210 through input devices such as a keyboard 1262 and pointing device 1261, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 1220 through a user input interface 1260 that is coupled to the system bus 1221, but may be connected by other interface and bus structures, such as, for example, a parallel port, game port or a universal serial bus (USB). A monitor 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 may operate in a networked environment using logical connections to one or more remote computers, such as a remote computer 1280. The remote computer 1280 may be a personal computer, a server, a router, a network PC, a peer device or other common network node, and typically includes many or all of the elements described above relative to the computer 1210, although only a memory storage device 981 has been illustrated in FIG. 12. The logical connections depicted in FIG. 12 include a local area network (LAN) 1271 and a wide area network (WAN) 1273, but may also include other networks. Such networking environments are commonplace in offices, enterprise-wide computer networks, intranets and the Internet.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. The modem 1272, which may be internal or external, may be connected to the system bus 1221 via the user input interface 1260, or other appropriate mechanism. In a networked environment, program modules depicted relative to the computer 1210, or portions thereof, may be stored in the remote memory storage device. By way of example, and not limitation, FIG. 12 illustrates remote application programs 1285 as residing on memory device 1281. It will be appreciated that the network connections shown are exemplary and other means of establishing a communications link between the computers may be used.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. An adaptive filter interpolation process for interpolating missing color values at a given pixel in a mosaiced color image, comprising:
    using a computer to perform the steps of:
        selecting a pixel having a current color and location from the mosaiced color image;
        for the given pixel location and color, computing the gradients in the horizontal and vertical directions and using these gradients to compute a gradient differential $G_d$;
        comparing $G_d$ to a threshold T and selecting interpolation filters from a small set of predetermined filters comprising horizontal, vertical and non-directional filters based on this comparison, wherein horizontal filters are selected if the gradient differential is greater than the negative of the threshold, wherein vertical filters are selected if the gradient differential is greater than the threshold, and wherein non-directional filters are selected if the absolute value of the gradient is less than the threshold; and
        computing an interpolation of the missing color values at the current pixel with the selected interpolation filters.

2. The process of claim 1 wherein said small set of predetermined filters further comprise:
    horizontal filters that perform interpolation across the horizontal direction
    vertical filters that perform interpolation across the vertical direction; and
    non-directional filters whose interpolation does not weigh either the horizontal or vertical directions more.

3. The process of claim 2 wherein said non-directional filters comprise:
    using a first interpolation technique based on a missing color at the selected pixel to determine a missing color estimate;
    calculating a gradient correction based on the current color;
    multiplying the gradient correction by a gradient-correction gain to obtain an adjusted gradient correction; and
    combining in a linear manner the missing color estimate and the adjusted gradient correction to obtain a linearly corrected missing color estimate corresponding to at least some of the missing color data.

4. The process of claim 1 wherein all missing color data is computed at each pixel before proceeding to the next pixel in the sequence.

5. The process of claim 1 wherein gradient differential, $G_d = |\Delta_H| - |\Delta_V|$, where $\Delta_H$ denotes the gradient in the horizontal direction and $\Delta_V$ denotes the gradient in the vertical direction, and $|\cdot|$ denotes magnitude.

6. The process of claim 5 wherein:
    if $G_d < -T$, filters are chosen that perform interpolation across the horizontal direction;
    if $G_d > +T$, filters are chosen that perform interpolation across the vertical direction;
    if $|G_d| < T$, non-directional filters are chosen.

7. The process of claim 6, wherein for a pixel pattern employing red R, green G, and blue B pixels arranged in five rows, with a first pixel 3-pixel row of pixels $G_9, R_1, G_{10}$, and a second 5-pixel row starting one pixel to the left of the first row of pixels $G_5, B_1, G_3, B_2$, and $B_6$, and a third 5-pixel row aligned with the second pixel row of pixels $R_3, G_1, R_0, G_2, R_4$, and a fourth 5-pixel row aligned with the third row of pixels $G_7, B_3, G_4, B_4$ and $G_8$, and a fifth 3-pixel row starting one pixel to the right of the fourth row of pixels $G_{11}, R_2$ and $G_{12}$, the interpolation filters at red pixel $R_0$ are found by:
    computing Gd using $\Delta_H = G_2 - G_1$ and $\Delta_V = G_4 - G_3$;
    calculating the horizontal interpolation filter for Green $G_0$ as $\frac{1}{2}[G_1+G_2]+a_1[2R_0-R_3-R_4]$ where $a_1$ is a first correction gain factor;
    computing the horizontal interpolation filter for Blue as $B_0 = G_0 + C_{B-G}$ where the correction factor $C_{B-G}$ is computed as $C_{B-G} = \frac{1}{4}[B_1+B_2-G_3-\frac{1}{2}(G_5+G_6)]+\frac{1}{4}[B_3+B_4-G_4-\frac{1}{2}(G_7+G_8)]$ or its approximate equivalent;
    computing the vertical interpolation filter for Green as $G_0 = \frac{1}{2}[G_3+G_4]+a_2[2R_0-R_1-R_2]$ where $a_2$ is a second correction gain factor;
    computing the vertical interpolation filter for Blue as $B_0 = G_0 + C_{B-G}$ where $C_{B-G} = \frac{1}{4}[B_1+B_3-G_1-\frac{1}{2}(G_9+G_{11})]+\frac{1}{4}[B_2+B_4-G_2-\frac{1}{2}(G_{10}+G_{12})]$ or its approximate equivalent;
    computing the non-directional interpolation filter for Green as $G_0 = \frac{1}{4}[G_1+G_2+G_3+G_4]+a_3[4R_0-R_1-R_2-R_3-R_4]$ where $a_3$ is a third correction gain factor; and
    computing the non-directional interpolation filter for Blue as $B_0 = \frac{1}{4}[B_1+B_2+B_3+B_4]+a_4[R_0-\frac{1}{4}(R_1+R_2+R_3+R_4)]$ where $a_4$ is a fourth correction gain factor.

8. The process of claim 6 wherein for a pixel pattern employing red R, green G, and blue B pixels arranged in five rows, with a first 3-pixel row of pixels $G_9, B_1, G_{10}$, and a second 5-pixel row starting one pixel to the left of the first row of pixels G5, R1, $G_3, R_2$, and $G_6$, and a third 5-pixel row aligned with the second pixel row of pixels $B_3, G_1, B_0, G_2, B_4$, and a fourth 5-pixel row aligned with the third row of pixels $G_7, R_3, G_4, R_4$ and $G_8$, and a fifth 3-pixel row starting one pixel to the right of the fourth row of pixels $G_{11}, B_2$ and $G_{12}$, the interpolation filters for a blue pixel $B_0$ are found by:
    computing Gd using $\Delta_H = G_2 - G_1$; $\Delta_V = G_4 - G_3$;

computing the horizontal interpolation filter for Green as $G_0=\frac{1}{2}[G_1+G_2]+b_1[2B_0-B_3-B_4]$ where $b_1$ is a first correction gain parameter;

computing the horizontal interpolation filter for Red $R_0=G_0+C_{R-G}$, where the correction factor $C_{R-G}$ is computed as $C_{R-G}=\frac{1}{4}[R_1+R_2-G_3-\frac{1}{2}(G_5+G_6)]+\frac{1}{4}[R_3+R_4-G_4-\frac{1}{2}(G_7+G_8)]$ or its approximate equivalent;

computing the vertical interpolation filter for Green as $G_0=\frac{1}{2}[G_3+G_4]+b_2[2B_0-B_1-B_2]$ where $b_2$ is a second correction gain factor;

computing the vertical interpolation filter for Red $R_0=G_0+C_{R-G}$ with $C_{R-G}=\frac{1}{4}[R_1+R_3-G_1-\frac{1}{2}(G_9+G_{11})]+\frac{1}{4}[R_2+R_4-G_2-\frac{1}{2}(G_{10}+G_{12})]$;

computing the non-directional interpolation filter for Green is defined as $G_0=\frac{1}{4}[G_1+G_2+G_3+G_4]+b_3[4B_0-B_1-B_2-B_3-B_4]$ where $b_3$ is a third correction gain parameter; and computing the non-directional interpolation filter for Red as $R_0=\frac{1}{4}[R_1+R_2+R_3+R_4]+b_4[B_0-\frac{1}{4}(B_1+B_2+B_3+B_4)]$ where $b_4$ is a fourth correction gain parameter.

9. The process of claim 6 wherein for a pixel pattern employing red R, green G, and blue B pixels arranged in five rows, with a first row of $R_3$, $G_7$, $R_4$, and a second 5-pixel row starting one pixel to the left of the first row of $B_3$, $G_1$, $B_1$, $G_2$, and $B_5$, and a third 5-pixel row aligned with the second pixel row of pixels $G_5$, $R_1$, $G_0$, $R_2$, $G_6$, and a fourth 5-pixel row aligned with the third row of $B_4$, $G_3$, $B_2$, $G_4$ and $B_6$, and a fifth 3-pixel row starting one pixel to the right of the fourth row of $R_5$, $G_8$ and $R_6$, for a green pixel $G_0$ in a Red pixel row and Blue pixel column the gradient differential $G_d$ is calculated by one of three ways:

using $\Delta_H=B_2-B_1$ and $\Delta_V=R_2-R_1$;

using $\Delta_H=\frac{1}{2}[(G_2-G_1)+(G_4-G_3)]$ and $\Delta_V=\frac{1}{2}[(G_3-G_1)+(G_4-G_2)]$; or using $|\Delta_H|=\frac{1}{2}[|G_2-G_1|+|G_4-G_3|]$ and $|\Delta_V|=\frac{1}{2}[|G_3-G_1|+|G_4-G_2|]$.

10. The process of claim 9 wherein the interpolation filters at Green pixel $G_0$ are found by:

computing the horizontal interpolation filter for Red as $R_0=\frac{1}{2}[R_1+R_2]+c_1[2G_0-G_5-G_6]$ where $c_1$ is a first correction gain factor;

computing the horizontal interpolation filter for Blue as $B_0=G_0+C_{B-G}$ where the correction factor $C_{B-G}$ is computed as $C_{B-G}=\frac{1}{4}[B_1+B_2+\frac{1}{2}(B_3+B_5+B_4+B_6)]-(G_1+G_2+G_3+G_4)]$ or its approximate equivalent;

computing the vertical interpolation filter for Red as $R_0=G_0+C_{R-G}$ where the correction factor $C_{R-G}$ is computed as $C_{R-G}=\frac{1}{4}[R_1+R_2+\frac{1}{2}(R_3+R_5+R_4+R_6)]-(G_1+G_2+G_3+G_4)]$ or its approximate equivalent;

computing the vertical interpolation filter for Blue as $B_0=\frac{1}{2}[B_1+B_2]+c_2[2G_0-G_7-G_8]$ where $c_2$ is a second correction gain factor;

computing the non-directional interpolation filter for Red as $R_0=\frac{1}{2}[R_1+R_2]+\frac{1}{8}[c_3G_0-c_4(G_1+G_2+G_3+G_4+G_5+G_6)+c_5(G_7+G_8)]$ where c4 is a fourth correction gain factor; and computing the non-directional interpolation filter for Blue as $B_0=\frac{1}{2}[B_1+B_2]+\frac{1}{8}[c_3G_0-c_4(G_1+G_2+G_3+G_4+G_7+G_8)+c_5(G_5+G_6)]$ where $c_5$ is a fifth correction gain factor.

11. The process of claim 6 wherein for a pixel pattern employing red R, green G, and blue B pixels arranged in five rows, with a first 3-pixel row of pixels $B_3$, $G_7$, $B_4$, and a second 5-pixel row starting one pixel to the left of the first row of pixels B3, G1, $R_1$, $G_2$, and $B_5$, and a third 5-pixel row aligned with the second pixel row of pixels $G_5$, $B_1$, $G_0$, $B_2$, $G_6$, and a fourth 5-pixel row aligned with the third row of pixels $R_4$, $G_3$, $R_2$, $G_4$ and $R_6$, and a fifth 3-pixel row starting one pixel to the right of the fourth row of pixels $B_5$, $G_8$ and $B_6$, for a green pixel $G_0$ in a Blue pixel row and Red pixel column the gradient differential $G_d$ is calculated by one of three ways:

using $\Delta_H=B_2-B_1$ and $\Delta_V=R_2-R_1$;

using $\Delta_H=\frac{1}{2}[(G_2-G_1)+(G_4-G_3)]$ and $\square_V=\frac{1}{2}[(G_3-G_1)+(G_4-G_2)]$; and using $|\Delta_H|=\frac{1}{2}[|G_2-G_1|+|G_4-G_3|]$ and $|\Delta_V|=\frac{1}{2}[|G_3-G_1|+|G_4-G_2|]$.

12. The process of claim 11 wherein the interpolation filters at Green pixel $G_0$ are found by:

computing the horizontal interpolation filter for Blue as $B_0=\frac{1}{2}[B_1+B_2]+d_1[2G_0-G_5-G_6]$ where $d_1$ is a first correction gain factor;

computing the horizontal interpolation filter for Red as $R_0=G_0+C_{R-G}$ where the correction factor $C_{R-G}$ is computed as $C_{R-G}=\frac{1}{4}[R_1+R_2+\frac{1}{2}(R_3+R_5+R_4+R_6)]-(G_1+G_2+G_3+G_4)]$ or its approximate equivalent;

computing the vertical interpolation filter for Blue as $B_0=G_0+C_{B-G}$ where the correction factor $C_{R-G}$ is computed as $C_{B-G}=\frac{1}{4}[B_1+B_2+\frac{1}{2}(B_3+B_5+B_4+B_6)]-(G_1+G_2+G_3+G_4)]$ or its approximate equivalent;

computing the vertical interpolation filter for Red by $R_0=\frac{1}{2}[R_1+R_2]+d_2[2G_0-G_7-G_8]$ where $d_2$ is a second correction gain factor;

computing the non-directional interpolation filter for Blue as $B_0=\frac{1}{2}[B_1+B_2]+\frac{1}{8}[d_3G_0-d_4(G_1+G_2+G_3+G_4+G_5+G_6)+d_5(G_7+G_8)]$ where $d_3$ is a third correction gain factor; and computing the non-directional interpolation filter for Red as $R_0=\frac{1}{2}[R_1+R_2]+\frac{1}{8}[d_3G_0-d_4(G_1+G_2+G_3+G_4+G_7+G_8)+d_5(G_5+G_6)]$.

13. The process of claim 1, further comprising:

defining a region of support as a size of a pixel neighborhood whose values are considered for computation associated with any given pixel;

using the region of support to compute the horizontal and vertical gradients and the interpolation filters.

14. The process of claim 13, wherein the region of support is equal to or greater than a 5×5 pixel region centered at the selected pixel.

15. A computer-readable storage medium having computer-executable instructions for performing the process recited in claim 1.

16. An adaptive filter interpolation system for interpolating a missing color value at a given pixel in a color image, comprising:

a general purpose computing processor; and a computer program comprising program modules executable by the computing processor, wherein the computing processor is directed by the program modules of the computer program to, select current pixel having a current color from an image sensor array that represents a color image;

for the selected pixel, compute the gradient in the horizontal and vertical directions and a gradient differential $G_d$;

compare $G_d$ to a threshold T and select filters from a set of filters comprising horizontal, vertical and a non-directional filters based on this comparison, wherein horizontal filters that perform interpolation across the horizontal direction are selected if $G_d>-T$; vertical filters that perform interpolation across the vertical direction are selected if $G_d>+T$; and non-directional filters are chosen if $|G_d|<T$; and compute an interpolation of the missing color values at the current pixel using the selected filter.

17. The system of claim 16 wherein all missing color data is interpolated by one computational sequence for each pixel of the image.

18. The system of claim 16 wherein near optimal linear filters are employed for pixels in which $|G_d|$ is below the threshold T.

19. A method for interpolating missing color data for a pixel in mosaiced color image data, comprising:

using a computer to perform the steps of:
   for a given pixel computing horizontal and vertical gradients using only green pixels;
   based on the computed horizontal and vertical gradients, computing a gradient differential;
   choosing appropriate interpolation filters from a small set of predetermined filters comprising horizontal, vertical and non-directional filters, wherein horizontal filters are selected if the gradient differential is greater than the negative of a threshold, wherein vertical filters are selected if the gradient differential is greater than the threshold, and wherein non-directional filters are selected if the absolute value of the gradient is less than the threshold; and
   applying the interpolation filters chosen from the horizontal, vertical and non-directional filters to interpolate missing color data at the current pixel.

* * * * *